(12) United States Patent
He et al.

(10) Patent No.: US 12,003,794 B2
(45) Date of Patent: *Jun. 4, 2024

(54) SCHEDULING MULTIPLE-LAYER VIDEO SEGMENTS

(71) Applicant: InterDigital Madison Patent Holdings, SAS, Paris (FR)

(72) Inventors: Yong He, San Diego, CA (US); Ahmed Hamza, Montreal (CA); Srinivas Gudumasu, Montreal (CA); Yan Ye, San Diego, CA (US); Eduardo Asbun, Santa Clara, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,626

(22) Filed: May 3, 2023

(65) Prior Publication Data
US 2023/0269408 A1 Aug. 24, 2023

Related U.S. Application Data

(63) Continuation of application No. 17/850,435, filed on Jun. 27, 2022, now Pat. No. 11,677,993, which is a
(Continued)

(51) Int. Cl.
*H04N 21/2343* (2011.01)
*H04N 21/262* (2011.01)
*H04N 21/845* (2011.01)

(52) U.S. Cl.
CPC ....... *H04N 21/234327* (2013.01); *H04N 21/23439* (2013.01); *H04N 21/26216* (2013.01); *H04N 21/8456* (2013.01)

(58) Field of Classification Search
CPC ..... H04N 21/234327; H04N 21/23439; H04N 21/26216; H04N 21/8456
See application file for complete search history.

(56) References Cited

U.S. PATENT DOCUMENTS

| | | | |
|---|---|---|---|
| 9,264,472 B2 | 2/2016 | Costanzo et al. | |
| 9,445,136 B2 * | 9/2016 | Gillies | H04N 21/44209 |

(Continued)

FOREIGN PATENT DOCUMENTS

| | | |
|---|---|---|
| CN | 102781004 A | 11/2012 |
| EP | 2360923 A1 | 8/2011 |

(Continued)

OTHER PUBLICATIONS

"JM16.1 Reference Software", Document JVT-AE010, Available at <https://iphome.hhi.de/suehring/tml/download/old_jm/?C=N;O=D>, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

(Continued)

*Primary Examiner* — Schquita D Goodwin
(74) *Attorney, Agent, or Firm* — Smadar Gefen

(57) ABSTRACT

A streaming device may request and download multi-layer video segments based on a number of factors including the artistic interest associated with the video segments and/or the status of a buffer area managed by the streaming device. The multi-layer segments may be coded using scalable coding techniques or a combination of scalable coding and simulcast coding techniques by which each of the video segments may be coded into one or more representations of different qualities and/or bitrates. When requesting the multi-layer segments, the streaming device may ensure that the fullness of the buffer area falls between a buffer underflow threshold and a backfilling threshold under various network conditions. The streaming device may estimate the (Continued)

available network bandwidth in order to facilitate the scheduling decisions. The streaming device may consider the artistic interest associated with the video segments during scheduling and may give priority to those segments with higher artistic interest.

22 Claims, 20 Drawing Sheets

Related U.S. Application Data continuation of application No. 16/061,245, filed as application No. PCT/US2016/066171 on Dec. 12, 2016, now Pat. No. 11,533,521.

(60) Provisional application No. 62/266,333, filed on Dec. 11, 2015.

(56) References Cited

U.S. PATENT DOCUMENTS

| | | | |
|---|---|---|---|
| 9,510,036 B1 | 11/2016 | Lewis et al. | |
| 9,544,388 B1 | 1/2017 | Li et al. | |
| 10,063,921 B2 | 8/2018 | He et al. | |
| 10,178,140 B2 * | 1/2019 | Reznik | H04N 21/8456 |
| 10,296,283 B2 | 5/2019 | Millington | |
| 10,581,943 B2 | 3/2020 | Furtwangler et al. | |
| 11,057,446 B2 | 7/2021 | Shribman et al. | |
| 2010/0027963 A1 | 2/2010 | Shiitani et al. | |
| 2012/0079000 A1 | 3/2012 | Calcev et al. | |
| 2012/0110628 A1 | 5/2012 | Candelore | |
| 2012/0322412 A1 | 12/2012 | Qiang | |
| 2013/0007223 A1 | 1/2013 | Luby et al. | |
| 2013/0019273 A1 | 1/2013 | Ma et al. | |
| 2013/0070859 A1 | 3/2013 | Lu et al. | |
| 2013/0125187 A1 | 5/2013 | Kim et al. | |
| 2013/0223509 A1 | 8/2013 | Tweedale et al. | |
| 2013/0336638 A1 | 12/2013 | Fork et al. | |
| 2014/0010282 A1 | 1/2014 | He et al. | |
| 2014/0092869 A1 | 4/2014 | Lai | |
| 2014/0219230 A1 | 8/2014 | Schierl et al. | |
| 2014/0258552 A1 | 9/2014 | Oyman et al. | |
| 2014/0279852 A1 | 9/2014 | Chen | |
| 2014/0317658 A1 | 10/2014 | Malik | |
| 2015/0082349 A1 | 3/2015 | Ishtiaq et al. | |
| 2015/0095512 A1 | 4/2015 | Ali et al. | |
| 2015/0256600 A1 | 9/2015 | Dakhane et al. | |
| 2015/0271231 A1 | 9/2015 | Luby et al. | |
| 2016/0088054 A1 | 3/2016 | Hassan et al. | |
| 2016/0112742 A1 | 4/2016 | Skarp et al. | |
| 2016/0142510 A1 | 5/2016 | Westphal et al. | |
| 2016/0255355 A1 | 9/2016 | Andersson et al. | |
| 2016/0323606 A1 | 11/2016 | Mao et al. | |
| 2017/0034583 A1 | 2/2017 | Long et al. | |
| 2017/0078735 A1 | 3/2017 | Greene | |
| 2017/0374432 A1 * | 12/2017 | Adzic | H04N 19/154 |
| 2018/0103276 A1 | 4/2018 | Piron et al. | |
| 2020/0267429 A1 | 8/2020 | He et al. | |

FOREIGN PATENT DOCUMENTS

| | | | | |
|---|---|---|---|---|
| EP | 2717626 A2 | 4/2014 | | |
| WO | WO2013044025 A2 | 3/2013 | | |
| WO | WO-2014138331 A2 * | 9/2014 | ....... | H04N 21/23439 |
| WO | WO2015003125 A2 | 1/2015 | | |

OTHER PUBLICATIONS

Asbun et al., "DASH Segment Scheduling for Scalable UHD Video Streaming", IEEECOMSOC MMTC Communications—Frontiers, vol. 11, No. 1, Jan. 2016, pp. 73-78.

CATT: "Network Selection Policy Based on QoS", 3GPP TSG RAN WG2 Meeting #81bis, R2-130969Chicago, USA, Apr. 15-19, 2013, 2 pages.

Tourapis et al. "H.264/14496-10 AVC Reference Software Manual (revised for JM18.0)", Joint Video Team (JVT) of ISO/IEC MPEG & ITU-T VCEG (ISO/IECJTC1/SC29/WG11 and ITU-T SG16 Q.6), 31st Meeting: London, UK, Jun. 28-Jul. 3, 2009, 97 pages.

Ye, et al., "The Scalable Extensions of HEVC for Ultra-High-Definition Video Delivery", IEEE MultiMedia, vol. 21, No. 3, Jul. 22, 2014, pp. 58-64.

Sullivan et al., "Overview of the High Efficiency Video Coding (HEVC) Standard", Institute of Electrical and Electronics Engineers (IEEE), IEEE Transactions on Circuits and Systems for Video Technology, vol. 22, No. 12, Dec. 2012, 19 pages.

ISO/IEC, "Information Technology-Generic Coding of Moving Pictures and Associated Audio information: Video", ISO/IEC 13818-2, Dec. 2000, 220 pages.

Müller, Christopher, et al., "Using Scalable Video Coding for Dynamic Adaptive Streaming over HTTP in Mobile Environments", Proceedings of the European Signal Processing Conference (EUSIPCO), 2012.

Gao et al., "Real-time scheduling on scalable media stream delivery", Proceedings of The 2003 Internationalsymposium On Circuits and Systems, 2003. ISCAS 2003; [IEEE International Symposiumon Circuits and Systems], IEEE, vol. 2, May 25, 2003 (May 25, 2003), pages II-824, XP002366012, ISBN: 978-0-7803-7761-5*the whole document *.

Sodagar et al., "The MPEG-DASH Standard for Multimedia Streaming Over the Internet", IEEE Multimedia, vol. 18, No. 4, Apr. 1, 2011, 6 pages.

International Telecommunication Union (ITU), Advanced Video Coding for Generic Audiovisual Services, Series H: Audiovisual and Multimedia Systems; Infrastructure of Audiovisual Services—Coding of Moving Video; ITU-T Tec H.264 and ISO/IEC/MPEG 4 Part 10, Advanced Video Coding for Generic Audiovisual Services, Nov. 2007, 680 pages.

SMPTE 421M, "VC-1 Compressed Video Bitstream Format and Decoding Process". SMPTE Standard, Apr. 2006, 493 pages.

Anonymous, "Series H: Audiovisual and Multimedia Systems—Infrastructure of audiovisual services—Coding of moving video—High Efficiency Video Coding (HEVC)", Telecommunication Standardization Sector of ITU, Recommendation ITU-T H.265, Oct. 2014, 540 pages.

Sullivan et al. "Standardized Extensions of High Efficiency Video Coding (HEVC)", IEEE Journal of Selected Topics In Signal Processing, vol. 7, No. 6, Dec. 2013, pp. 1001-1016.

ITU-T, "High Efficiency Video Coding", ITU-T Rec H.265 and ISO/IEC 23008-2, Version: 1, Series H: Audiovisual And Multimedia Systems, Infrastructure of Audiovisual Services—Coding of Moving Video, Apr. 2013, 317 pages.

* cited by examiner

SCHEDULING MULTIPLE-LAYER VIDEO SEGMENTS

CROSS-REFERENCE TO RELATED APPLICATIONS

This application is a Continuation of U.S. application Ser. No. 17/850,435, filed Jun. 27, 2022, which is a Continuation of U.S. application Ser. No. 16/061,245, filed Jun. 11, 2018, (U.S. Pat. No. 11,533,521) which is a National Phase entry under 35 U.S.C. § 371 of International Application No. PCT/US2016/066171, filed Dec. 12, 2016, which claims the benefit of U.S. Provisional Patent Application Ser. No. 62/266,333, filed Dec. 11, 2015, which is incorporated by reference herein in its entirety.

BACKGROUND

Media content such as video content may be streamed over a communication network (e.g., a HTTP-based network). Many of the solutions deployed today, e.g., Microsoft's Smooth Streaming, Adobe's dynamic HTTP streaming, and/or Apple's HTTP Live Streaming (HLS), use non-scalable coding or simulcast to generate different bitstreams (e.g., with different bitrates and/or different resolutions) to accommodate varying bandwidth capacities and/or display sizes. HTTP adaptive streaming (HAS) may be deployed to provide flexibility in terms of adapting the video content to different client capabilities and network conditions. However, current HAS implementations suffer from several shortcomings. For example, compared to storing a single copy of high quality video content on a server (e.g., a streaming server), having multiple versions of the same content at different bitrates may increase the storage overheads on the server. Moreover, additional bandwidth may be needed at the server to transport the multiple versions. When different clients request different versions of the video content, depending on the clients' respective network conditions, caching nodes may quickly become overloaded and ineffective from having to store numerous versions of the same content, or to store a very high quality version and generate lower quality versions by transcoding. The former option may be inefficient in terms of cache server storage, whereas the latter option may put high computing demand on the cache servers. Another problem with the current HAS systems may be their lack of ability to efficiently handle sudden drops in bandwidth. One reason for this problem may be that once a client decides to request a video segment of a certain quality, the client may be unable to modify that decision based on changes in network conditions. Even when it is possible to change the decision, the client may have to issue a new request and as a result, one or more (e.g., all) partially downloaded video segments may be wasted.

SUMMARY

Systems, methods, and instrumentalities are described herein for providing and/or streaming video content. The video content may comprise multiple video segments each encoded into one or more representations of different qualities (e.g., a base layer representation with a low bitrate and/or an enhancement layer representation with a high bitrate). A video segment may be assigned an artistic interest (e.g., during content preparation) that indicates the artistic value of the video segment. A streaming device (e.g., such as a wireless transmit/receive unit described herein, a home gateway, etc.) may receive a description of the video content. The description may be in the form of a media presentation description (MPD) file. The description may comprise respective indications of the artistic interest associated with one or more video segments. The streaming device may maintain a buffer area for storing the video content that the device downloads from a streaming server. The buffer area may reside on the streaming device, or the buffer area may be located physically away from the streaming device. The streaming device may schedule the download based on a set of rules (e.g., in accordance with a buffer adaptation technique and/or inter-layer dependencies). The streaming device may decide, based on the set of rules, that a representation of a first video segment (e.g., an enhancement layer representation of the first video segment) should be requested next. The streaming device may compare the artistic interest associated with the first video segment with the artistic interest associated with a second video segment, and decide that the artistic interest associated with the second video segment is greater than the artistic interest associated with the first video segment. Upon making such a determination, the streaming device may request a representation of the second video segment (e.g., a high quality representation of the second video segment) from the streaming server prior to requesting a representation of the first video segment so that higher artistic interest content may be downloaded sooner and/or at a higher quality.

The description of the video content (e.g., the MPD file) may include the starting time and duration of a video segment. The description may include a uniform resource locator (URL) from which the video segment may be downloaded. The artistic interest associated with the video segment may be represented by numeric values within a certain range (e.g., 1-5 with 5 representing the highest artistic interest).

As described herein, a video segment may be encoded using scalable coding techniques into a base layer representation at a base bitrate and an enhancement layer representation at an enhanced bitrate that is higher than the base bitrate. The enhancement layer representation may depend on the base layer representation for decoding (e.g., the base layer may need to be downloaded first before the enhancement layer may be downloaded). A video segment with a high artistic interest value may be encoded using simulcast coding techniques. For example, a high artistic interest video segment may be encoded into one high-quality representation, and as such, the downloading of the high artistic interest segment may comprise downloading the high-quality representation without having to download a base layer representation first.

The buffer area managed by the streaming device (e.g., whether the buffer area is located on the streaming device or away from the streaming device) may be divided into a base buffer area for storing the base layer representations of the video segments and an enhancement buffer area for storing the enhancement layer representations of video segments (e.g., including the high-quality representations of high artistic interest segments). The base buffer area and/or the enhancement buffer area may be assigned an underflow threshold and a backfilling threshold. The backfilling threshold may be higher than the underflow threshold. The streaming device may be configured to maintain the fullness of the base buffer area and/or the enhancement buffer area between the underflow threshold and the backfilling threshold. The streaming device may be configured to request an enhancement layer representation of a video segment when (e.g., only when) the fullness of the base buffer area reaches or exceeds the backfilling threshold.

The streaming device may estimate the available network bandwidth in order to decide which representation of which video segment should be downloaded next. The streaming device may take multiple measurements of the network throughput at different times and derive the available network bandwidth based on a weighted average of the measurements. The streaming device may be configured to give more weight to a more recent measurement of the network throughput than to an earlier measurement of the network throughput when estimating the available network bandwidth. Upon obtaining an estimate of the available bandwidth, the streaming device may calculate the respective minimum bandwidths required to download the remaining video segments. The calculation may take into consideration the respective sizes, durations, and/or playback times associated with the video segments. The streaming device may compare the available network bandwidth with the respective minimum bandwidths and request the video segment that may be accommodated by the available network bandwidth.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
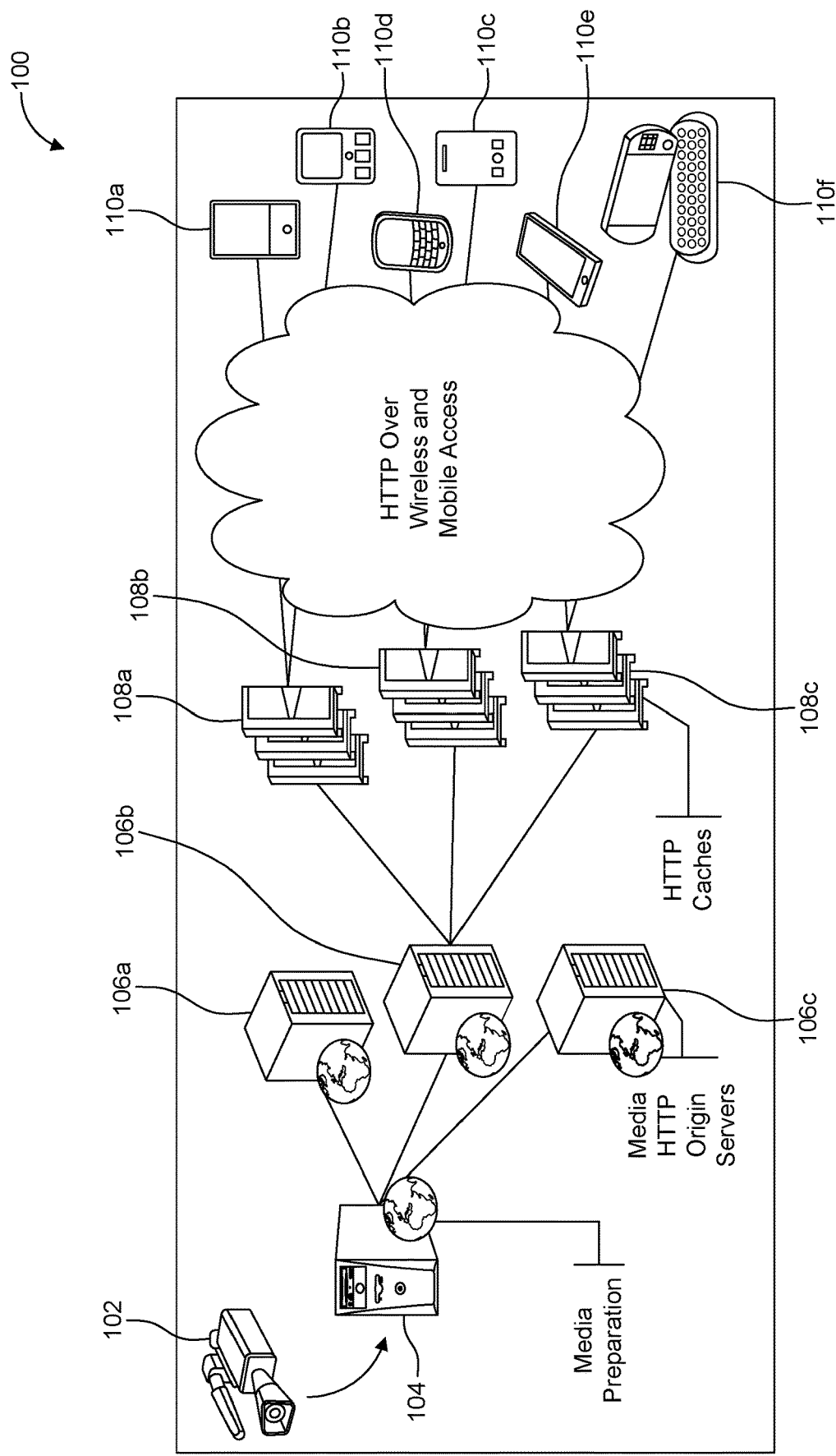
FIG. 1 shows an example HTTP-based video streaming system.

FIG. 1 illustrates an example HTTP-based video streaming system 100. The system 100 may include a media collection device 102 who may be configured to capture media (e.g., video, photograph, audio, etc.). The media collection device 102 may include a video camcorder, a camera, a voice recorder, a smart phone, a tablet, or any other device that has media collecting and/or capturing abilities. The media captured from the media collection device 102 may be transferred to a media preparation device 104 configured to prepare the media. The media collection device 102 and the media preparation device 104 may be independent devices. The media collection device 102 may include the capability to collect media as well as the ability to prepare the media. The media collection device 102 may serve as the media preparation device 104. The media preparation device 104 may compress and chop media into small segments (e.g., with segment periods between 2 and 10 seconds). The segments may be stored in an HTTP streaming server and distributed via a content delivery network (CDN) and/or edge server networks. The segments may be cached in one or more HTTP cache servers, which can be used by other users (e.g., to provide streaming service on a large scale). Once prepared (e.g., by the media preparation device 104), the media may be transferred to a wireless transfer/receive unit (WTRU) (e.g., shown as 110a, 110b, and/or 110c in FIG. 1, which are collectively referred to as 110 hereafter). The media may be transferred to the WTRU 110 from a media HTTP origin server 106. One or more HTTP cache devices 108 may be used to store previously transferred media to facilitate the delivery of the media from the HTTP origin server 106 to the WTRU 110.

The video streaming system 100 may employ HAS techniques. For example, when a streaming device requests particular video content (e.g., which may comprise a plurality of video segments each associated with a time position in the video content), the HTTP origin server 106 may send a media presentation description (MPD) manifest file to the streaming device. The MPD may include information about the video content (e.g., one or more (e.g., all) available bitrates of the requested video content, URLs from which the video may be downloaded, etc.). The streaming device may start by requesting a segment of the video content at a relatively low rate. Based on the time it takes to receive the segment, the streaming device may assess the network conditions (e.g., based on the streaming device's own assessment of the network conditions or an indication of the network conditions received from a network element). The streaming device may choose a next video segment adaptively, for example in accordance with the MPD and/or one or more other factors such as quality requirements, network bandwidth, device capabilities, etc. Such an adaptive approach may improve video quality, reduce latency, shorten start-up and/or buffering time, and/or bring other benefits.

Figure 2:
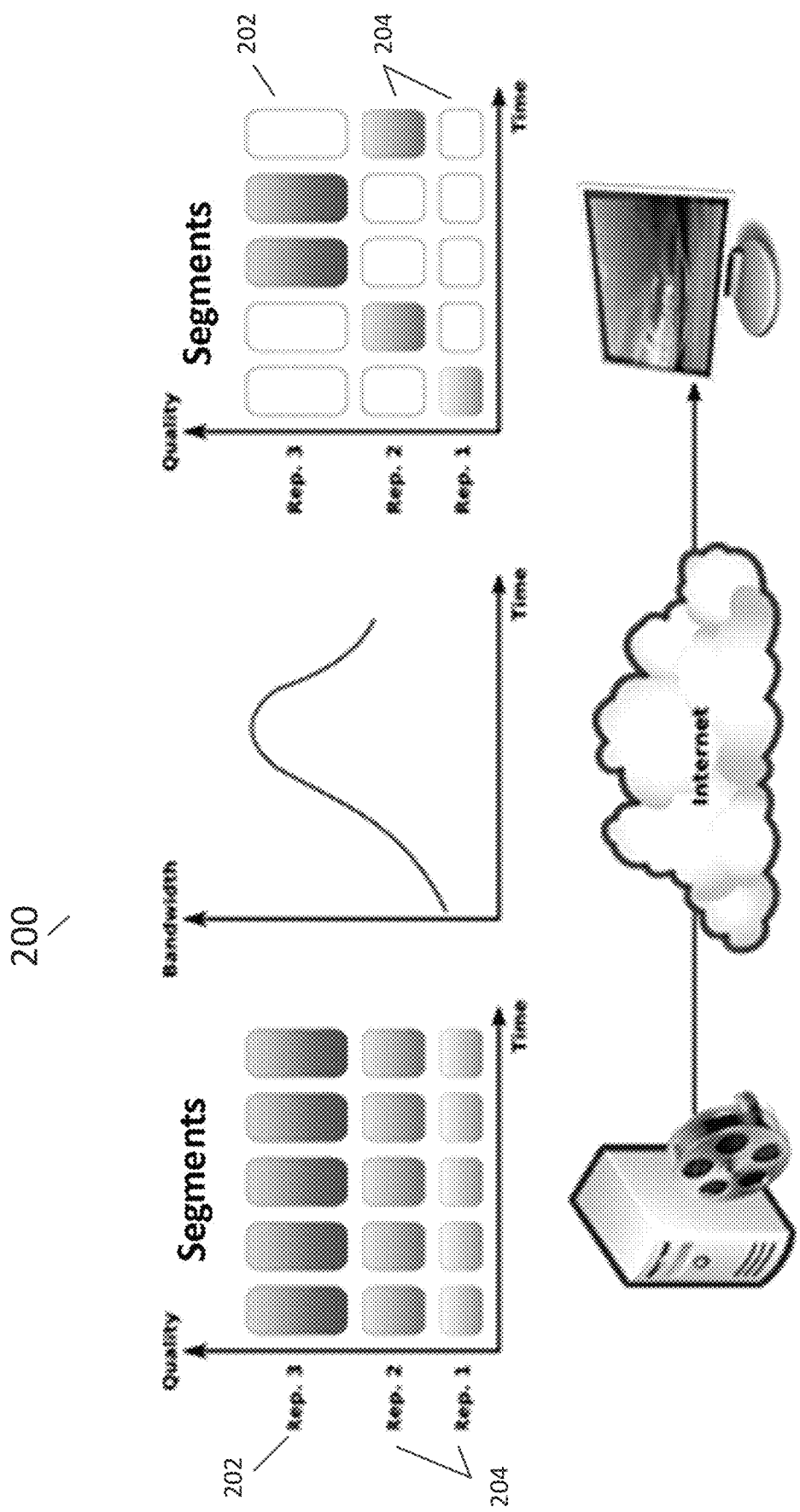
FIG. 2 shows an example HTTP-based adaptive video streaming process.

FIG. 2 shows an example HTTP-based adaptive streaming system 200 in which video content may be coded at different bitrates and/or different resolutions to generate representations of the content with different qualities. A streaming device in the adaptive streaming system 200 may select (e.g., request to download) different video segments based on one or more factors (e.g., network conditions and/or the streaming device's own capabilities). As FIG. 2 illustrates, high resolution or high bitrate segments (e.g., represented by the large boxes in the top row) may be requested and/or transmitted (e.g., from a streaming server) when network bandwidth is abundant. Lower resolution or lower bitrate segments (e.g., represented by the smaller boxes in the middle and bottom rows) may be requested and transmitted when network bandwidth is low.

Figure 3:
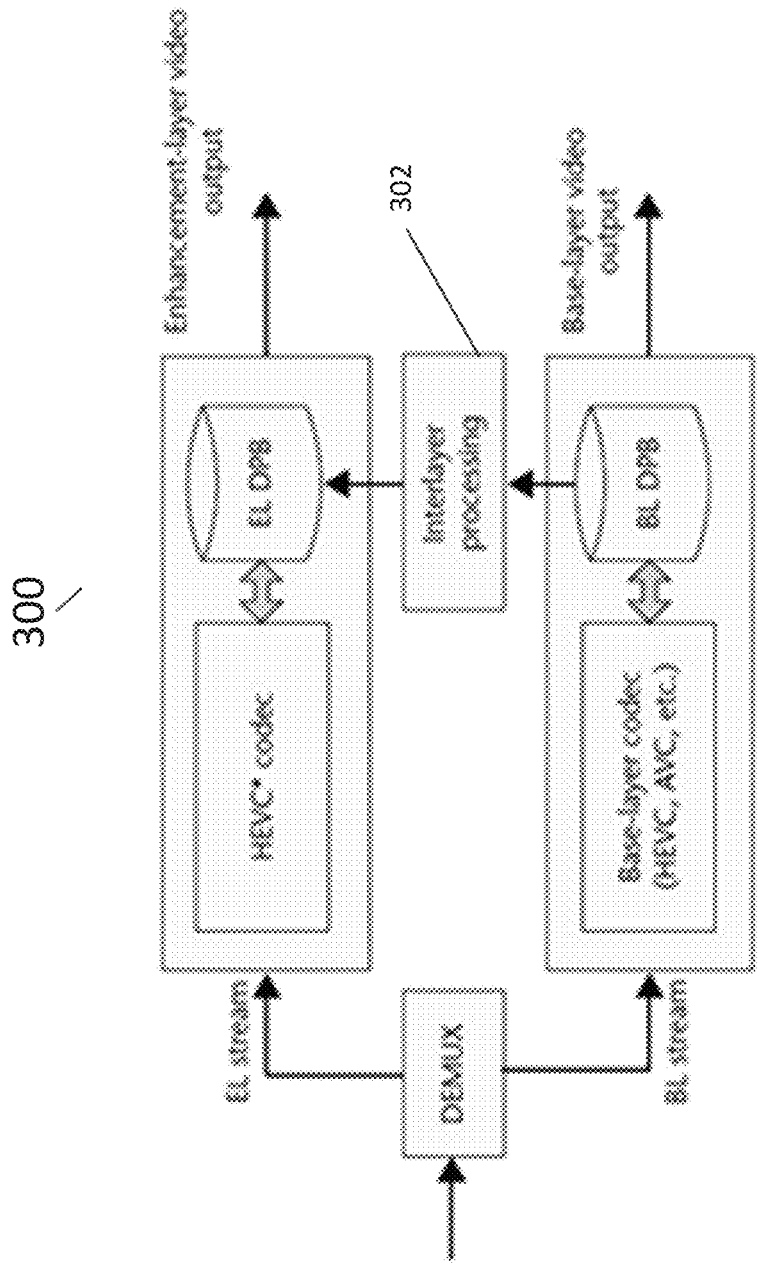
FIG. 3 shows an example decoder architecture for the scalable video coding extension of HEVC (SHVC).

The video content in the adaptive streaming system 200 may be coded using international video coding standards such as the MPEG1/2/4 Part 2, H.264/MPEG-4 Part 10 AVC, VC-1, and/or the latest H.265/HEVC (High Efficiency Video Coding) standard (e.g., which could potentially save 50% bandwidth compared to H.264 at the same visual quality). HEVC and its extensions may support efficient coding of a wide variety of video formats. The scalable video coding extension of HEVC (SHVC) may support scalable coding of multiple layers, each of which may correspond to a different representation of the original video content. For example, the layers may each have a different spatial resolution, different temporal frame rate, different quality, and/or different color space. FIG. 3 shows an example decoder architecture for SHVC. As shown, SHVC may use an inter-layer reference picture to predict an enhancement layer (EL). The coding tools in SHVC may be used for changes at the slice level and/or above, making it possible to re-use at least some of the existing single layer HEVC implementations. Inter-layer processing may include a resampling process (e.g., for spatial and/or bit depth scalability) and/or a color mapping process (e.g., for color gamut scalability (CGS)).

Table 1 shows the performances of SHVC and simulcast (e.g., in terms of spatial and signal-to-noise ratio (SNR) scalability) when two layers are coded independently. For random access, which is a coding configuration used in certain video entertainment applications, SHVC may achieve an overall rate reduction of 16.5% to 27% at the same peak signal-to-noise ratio (PSNR) when both base layer and enhancement layer bit rates are considered.

TABLE 1

SHVC Performance vs. Simulcast Performance

| Configuration | Anchor | 2× (%) | 1.5× (%) | SNR (%) |
|---|---|---|---|---|
| Random access | SHVC versus simulcast | 16.5 | 27.0 | 20.9 |
|  | SHVC EL versus single-layer EL | 26.0 | 47.6 | 31.4 |
| Low delay | SHVC versus simulcast | 10.3 | 21.5 | 12.5 |
|  | SHVC EL versus single-layer EL | 16.8 | 39.3 | 19.5 |

Scalable video coding may enable layered services to support the transmission and decoding of a partial bitstream. Different representations of the same content may be delivered to different devices based on their capabilities and reception conditions. Further, scalable streams may reduce the overall cost of storing a catalog (e.g., an entire catalog) in multiple bitrates, and/or the amount of upstream traffic generated from keeping CDN and edge caching content up to date.

Video content may be divided into a plurality of segments, e.g., along the timeline of the video content. Using scalable video coding, one or more of the video segments may be encoded into a number of layers of different qualities (e.g., different resolutions). The layers may include, for example, a base layer (BL) and/or one or more enhancement layers (EL). The enhancement layers of a video segment may have a higher quality than the base layer of the video segment, and one enhancement layer (e.g., EL2) may have a higher quality than another enhancement layer (e.g., EL1). The layers may correspond to respective entries in a manifest file (e.g., the MPD file described herein). A higher layer (e.g., a high quality enhancement layer) may depend on one or more lower layers (e.g., a medium quality enhancement layer and/or a base layer) for decoding. The size of a higher layer may be larger than that of a lower layer (e.g., with the base layer having the smallest size). As such, a streaming device may first download the smaller BL segments, and request the larger EL segments when extra bandwidth becomes available (e.g., to incrementally improve the quality of the decoded video).

Using the techniques described herein, a streaming device may avoid having to guess which representation (e.g., which layer) of a particular video segment should be requested in a given situation, since a video segment's quality may be adjusted (e.g., by requesting a different layer of the video segment) before its playback time. A variety of techniques may be used to schedule the download of a video segment. For example, in the face of sudden bandwidth decrease, the real bandwidth may be lower than an estimated bandwidth. With simulcast, the streaming device may have to abandon the download of a high quality representation of the video segment, and request a low quality representation. Such an approach may cause bandwidth waste and/or buffer underflow at the streaming device, leading to extra re-buffering time, for example. With scalable video coding and streaming, the streaming device may abandon the download of the high quality representation in similar situations, and request a lower quality representation of the video segment. As result, the chance of buffer underflow and/or re-buffering may be reduced.

Figure 4:
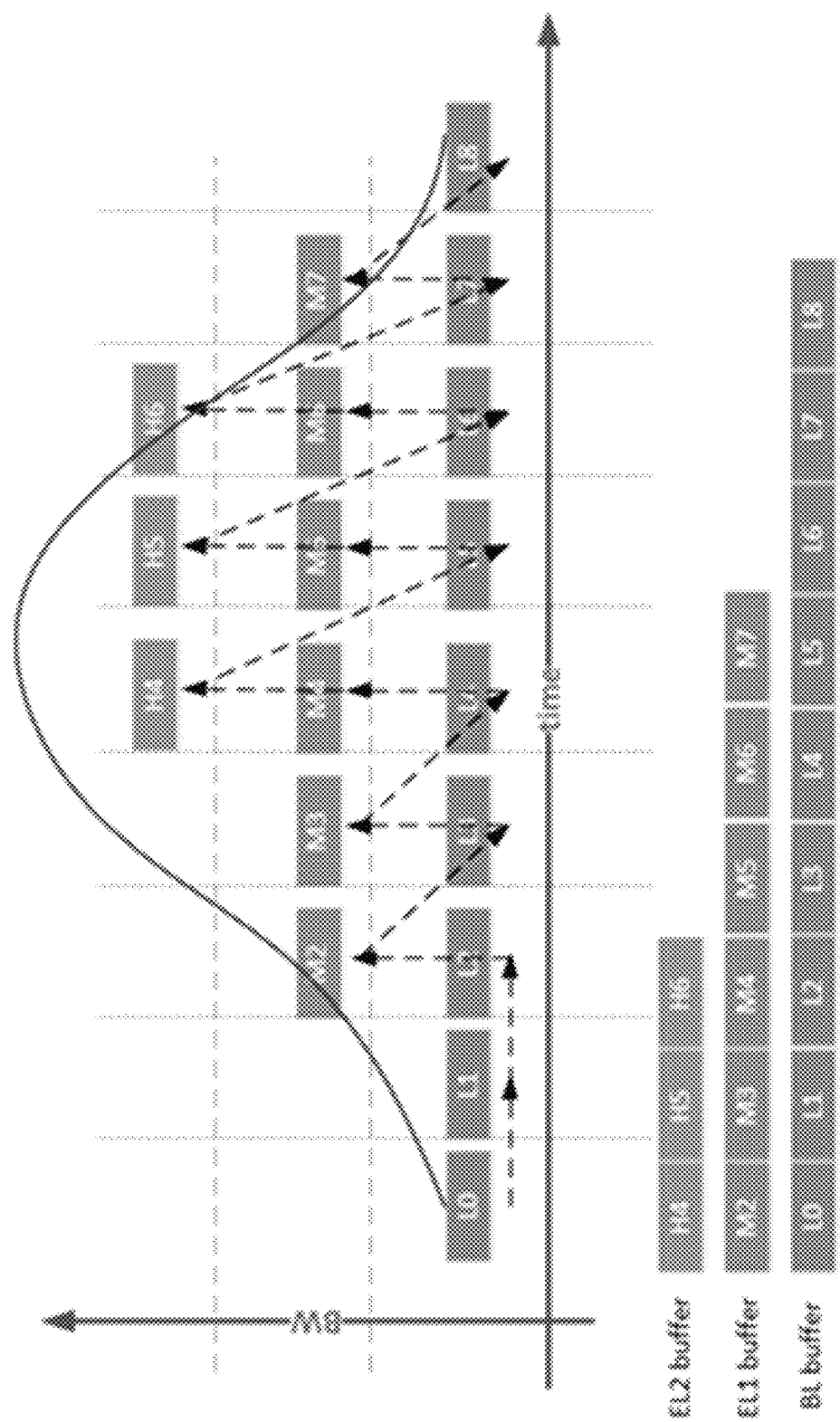
FIG. 4 shows an example scheduling process for adaptive streaming.

The MPEG Dynamic Adaptive Streaming for HTTP (DASH) standard includes syntax supporting scalable video streaming. The syntax may facilitate the identification of the different representations/layers of video content and the dependencies among them in a manifest file, also known as media presentation descriptor (MPD). FIG. 4 shows an example scheduling method for adaptive streaming. A streaming device may estimate the current network bandwidth and request an appropriate layer of a particular video segment (e.g., a low quality layer—BL, a medium quality layer—EL 1, or a high quality layer—EL 2), based on the following condition, for example:

$$\Sigma_{i=0}^{j+1} BR_i > BW_{est} \geq \Sigma_{i=0}^{j} BR_i \qquad (1)$$

where $BW_{est}$ may be the estimated network bandwidth and $BR_i$ may be the bitrate of a i-th layer of the particular video segment. Based on Equation (1), the streaming device may estimate the available network bandwidth $BW_{est}$, determine that the available network bandwidth $BW_{est}$ is greater than the sum of the bitrates of the j-th layer and the layers on which it is dependent, but less than the sum of the bitrates of the (j+1)-th layer and the layers on which it is dependent, and request the j-th layer and the layers on which the j-th layer is dependent.

The manifest file may specify the accumulated bitrate for an enhancement layer and/or the identifier (e.g., dependencyId) of one or more lower layers associated with the enhancement layer (e.g., on which the enhancement layer may be dependent). When the streaming device requests a particular enhancement layer of a video segment, an adaptive streaming scheduler may download the corresponding base layer of the video segment plus any lower layer that the requested enhancement layer depends on before downloading the enhancement layer. For example, the dashed line in FIG. 4 shows the downloading order of one or more layers/segments based on their dependencies. Using this example method, the streaming device may select an appropriate quality representation of the video content to download based on estimated available network bandwidth. Without fine-grained segment selection, however, user experience may be affected (e.g., when video quality changes from the highest layer to the base layer).

Figure 5:
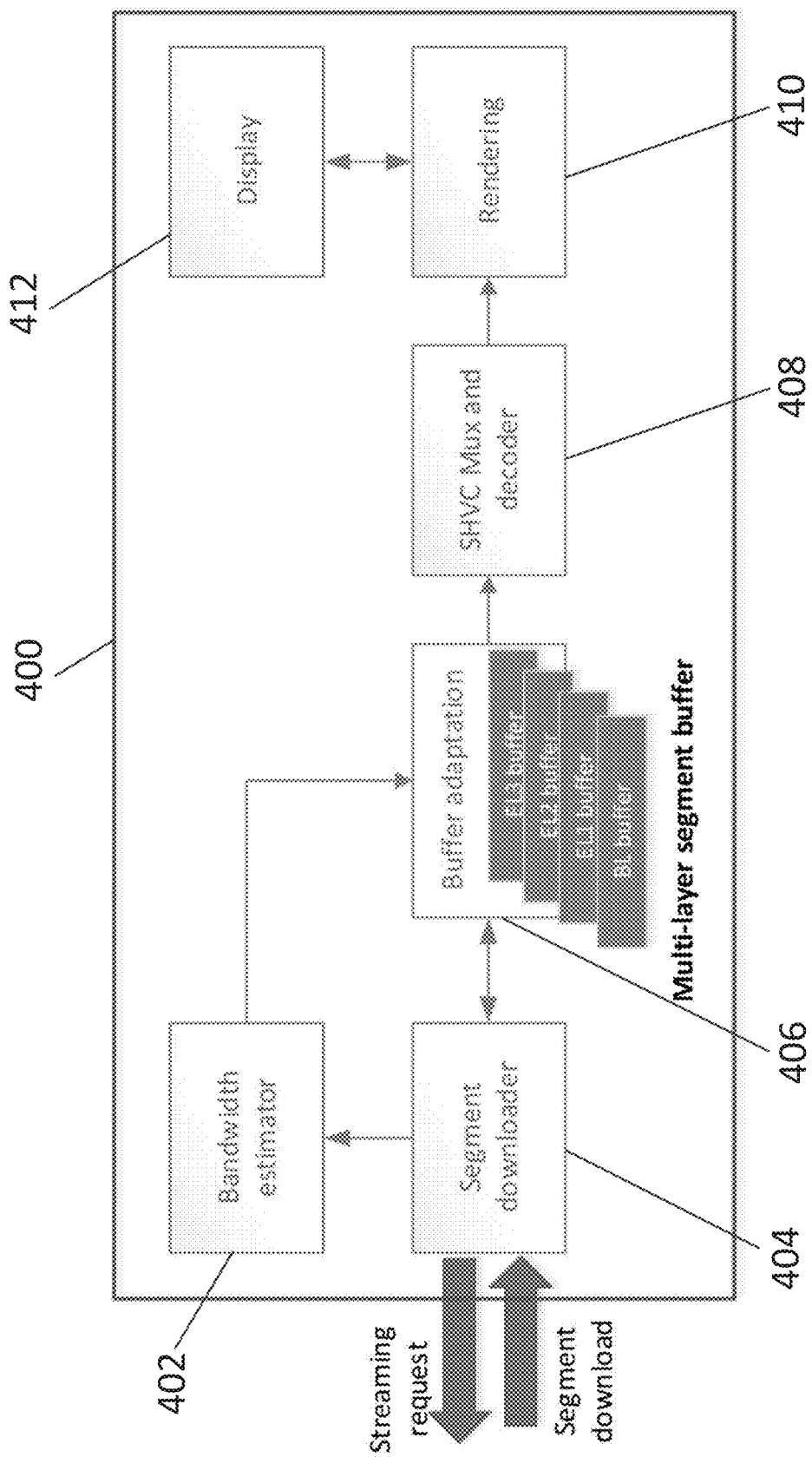
FIG. 5 shows an example SHVC streaming device architecture.

The streaming device may fetch an enhancement layer segment based on segments of a previously received base layer and/or dependent layer. FIG. 5 shows an example SHVC streaming device architecture 400. The streaming device 400 may include one or more of the following components: a bandwidth estimator 402, a segment downloader module 404, a buffer adaptation module 406, a scalable video multiplexer/decoder 408, a rendering module 410, and a display 412, as shown in FIG. 5. The one or more components 402-412 of the streaming device may or may not reside on the same physical platform. For example, the buffer adaptation module 406 may include buffer space for storing the segments of downloaded video content. The buffer space may reside on the same platform as one or more of the components 402-412, or be located away from some of the components (e.g., the buffer space may reside on a separate platform and be managed by the buffer adaptation module). The buffer space may comprise separate areas each designated to storing a particular layer of the segments. For example, there may be a BL area for storing the base layer segments, an EL1 area for storing the enhancement layer of a first quality, an EL2 area for storing the enhancement layer of a second quality, and/or an EL3 area for storing the enhancement layer of a third quality. It should be appreciated that the architecture shown in FIG. 5 is provided as an example. The streaming device may include more or few components than shown in FIG. 5. For example, the streaming device may be a WTRU, a home gateway, a CDN edge server, and/or the like.

The streaming device 400 may request and download one or more multi-layer segments based a buffer adaptation decision and/or previously downloaded segments, which may be stored in the multi-layer segment buffer 406. The one or more multi-layer segments may each be associated with an index. At decoding time, the multi-layer video segments with the same index may be passed to the scalable video multiplexer/decoder 408 (e.g., from the multi-layer segment buffer 406). The elementary streams of each frame within the multi-layer video segments may be extracted from their respective containers (e.g., mpeg files). The network abstraction layer (NAL) units of the different layers may be re-muxed to form the access unit (AU) of a single frame.

Figure 6:
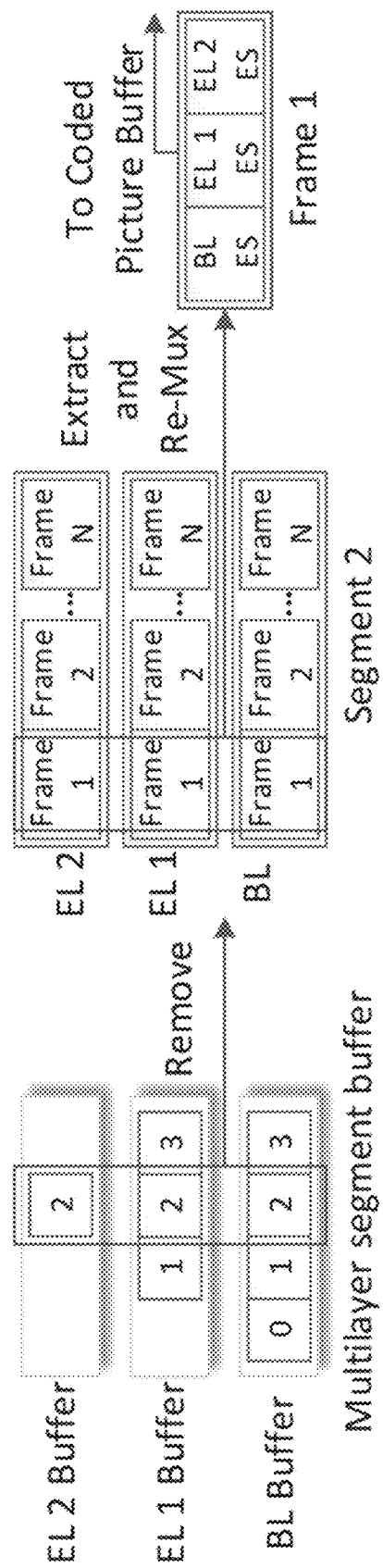
FIG. 6 shows an example layered video segment re-multiplexing (ReMux) process.

FIG. 6 shows an example layered video segment re-multiplexing (ReMux) process. A coded picture buffer (CPB) may hold the coded AUs in a first-in first-out (FIFO) order. The operation and/or configuration of the CPB (e.g., such as its size and/or the AU arrival and removal times) may be specified by a HEVC or SHVC hypothetical reference decoder (HRD). The decoded pictures may be stored in a decoded picture buffer (DPB) and subsequently retrieved by a rendering device for display.

The efficiency and quality of adaptive scheduling may be affected by the accuracy of bandwidth estimation. A streaming device may take measurements (e.g., using the bandwidth estimator 402) of the network throughput at various points (e.g., regularly or at selected points in time), and estimate the network bandwidth currently available to the client based on those measurements. For example, the streaming device may measure the network throughput $BW_t$ at time t (e.g., based on packets downloaded during a particular download task). The client may keep track of (e.g., record) each such measurement, and estimate the network bandwidth currently available to the streaming device by calculating a weighted average of the measurements. Greater weights may be given to more recent measurements, and smaller weights may be given to older measurements, as shown in Equation (2), for example.

$$BW[j] = \frac{\alpha_0 * BW_{t0} + \alpha_1 * BW_{t1} + \alpha_2 * BW_{t2} + \ldots + \alpha_n * BW_{tn}}{\alpha_0 + \alpha_1 + \alpha_2 + \ldots + \alpha_n} \quad (2)$$

Based on Equation (2), the streaming device may estimate the network bandwidth, BW[j], for downloading video segment j. The streaming device may take one or more measurements of the network throughput while downloading the video segment j (e.g., $BW_{t0}$ may be the latest throughput measurement, $BW_{t1}$ may be the throughput measurement taken before $BW_{t0}$, and so on). The streaming device may determine a weight, $\alpha_k$, that may be given to the k-th throughput measurement $BW_{tk}$. Greater weights may be given to more recent measurements (e.g., $\alpha_0 > \alpha_1 > \alpha_2 > \ldots > \alpha_n$). Based on the estimated throughput BW[j], the streaming device may decide (e.g., via the buffer adaptation module 406) which layer/segment to download and push that layer/segment to the download queue.

Figure 7:
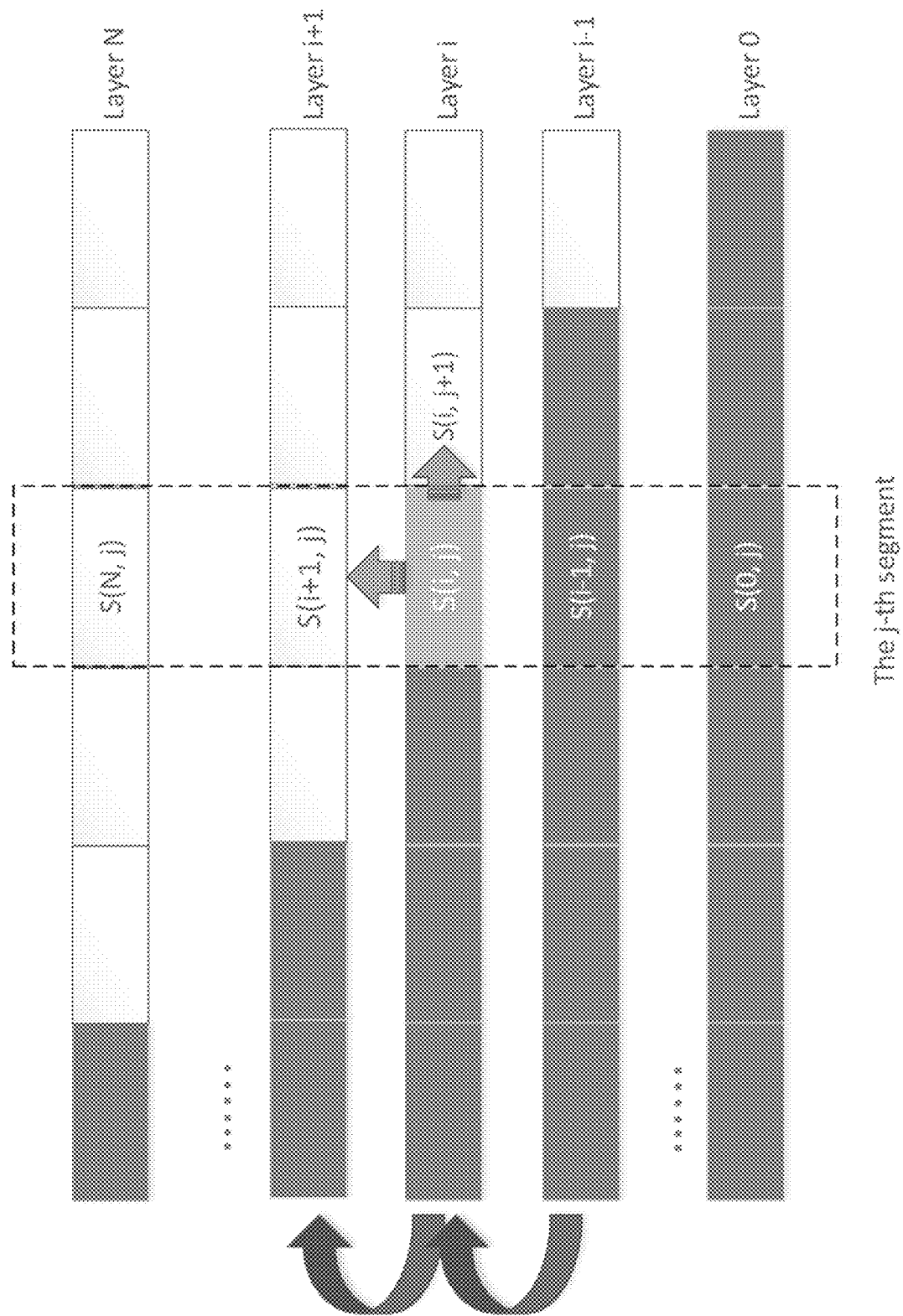
FIG. 7 shows an example order in which multi-layered video segments may be downloaded.

As described herein, a streaming device may determine (e.g., schedule) which segment to download next. The determination may be made, for example by the buffer adaptation module 406. FIG. 7 shows an example order in which multi-layered (e.g., 0~N) video segments may be downloaded. In the example, S(i, j) may represent the j-th segment of the i-th layer, with the (i+1)-th layer depending on the i-th layer, the i-th layer depending on the (i−1)-th layer, and so on. Accordingly, to decode segment S(i, j) of the i-th layer, it may be required that the j-th segments from the i-th layer's dependent layers be decoded first.

The streaming device (e.g., via the buffer adaption scheduler 406) may prioritize segment downloading based on a number of considerations including, for example, layer priority and time priority. With respect to layer priority, a lower layer may be given higher priority than a higher layer, e.g., P{S(i, j)}>P{S(i+1, j)}, assuming the higher layer depends on the lower layer for decoding. As a result, segment S(i, j) (e.g., the ith layer of the jth segment) may be downloaded before segment S(i+1, j) (e.g., the (i+1)th layer of the jth segment). With respect to time priority, a segment with a smaller index (e.g., representing a segment with play time closer to the current time) may be given higher priority than a segment with a larger index (e.g., representing a segment with play time farther away from the current time), e.g., P{S(i, j)}>P{S(i, j+1)}. As such, segment S(i, j) may be downloaded before segment S(i, j+1) under the constraints described herein.

In addition to or in lieu of sequential downloads in which segments S(i+1, j) or S(i, j+1) may be requested after the download of segment S(i, j) is completed, a parallel download approach may be employed. With the parallel approach, multiple segments may be requested and downloaded simultaneously. Scheduling may be adapted (e.g., updated dynamically) based on layer dependency such that bandwidth waste may be avoided during the download of an enhancement layer segment when the download of a corresponding lower layer (e.g., which the enhancement layer may depend on) fails, for example.

In certain situations, a determination may be made with respect to which one of segments S(i+1, j) and S(i, j+1) should be downloaded first (e.g., as shown by the dark straight arrows in FIG. 7). More generally, the buffer adaptation scheduler described herein may determine which layer/segment should be downloaded next so that the highest quality layer can be presented to the end user. Such a determination may be made based on one or more criteria including, for example, the available network bandwidth, the bitrate that would maximize the quality under existing bandwidth constraints, the fullness of the buffer space (e.g., to avoid buffer underflow and/or overflow, which may be gauged by a low threshold of fullness and/or a high threshold of fullness, respectively), and/or the quality fluctuations under time varying conditions (e.g., such as network bandwidth).

The multi-layer segment buffer described herein may be used to store requested video segments. The buffer may have a limited capacity and may accommodate a certain number of logical segments referred to herein as multi-layer video segments. A (e.g., each) multi-layer video segment may be associated with a number of layers (e.g., representations of the corresponding segment encoded into different qualities), the durations of which may be the same or may vary from one to the next. The layers may have the same segment index, but different qualities (e.g., different resolutions). The buffer space may comprise areas each allocated to store a particular layer of the video segments. For example, an area may be allocated to store the i-th layer of one or more video segments (e.g., of all the video segments). The capacity of the i-th layer buffer area may be denoted as B[i], and the fullness of the i-th layer buffer area may be denoted as F[i]. The buffer fullness F[i] may be measured in various ways including, for example, a unit of time (e.g., seconds) or the number of segments in the buffer area. For illustration purposes, the disclosure herein uses the number of segments in a buffer area to measure the buffer fullness.

The estimated buffer fullness, $F_{est}[i]$, of the i-th layer buffer area after one segment time (T) may be calculated using the following equation:

$$F_{est}[i]=F[i]+(T*BWest/S[i])-d[i] \quad (3)$$

As shown by Equation (3), the streaming device may estimate the buffer fullness after time period T based on the current buffer fullness, F[i], (e.g., as measured by the number of segments in the buffer), and the changes that may occur to the current buffer fullness after downloading a next segment. The streaming device may determine the duration of the next segment, T, and an estimated download bandwidth, $BW_{est}$. The streaming device may multiply the duration of the next segment and the estimated download bandwidth, and divide the result by the average size, S[i], of the segments stored in the i-th layer buffer area (e.g., measured in number of bits or bytes). The outcome of the foregoing operations may represent an estimated number of segments that may be added to the buffer area within the time period T. The streaming device may subtract from the aforementioned outcome the number of segments, d[i], that may be pulled from the buffer area (e.g., for decoding) during the time period T to derive the changes that may occur to the current buffer fullness. The estimated changes may then be applied to the current buffer fullness F[i] to arrive at $F_{est}[i]$.

One or more thresholds may be configured to facilitate the management of a buffer area. For example, an underflow threshold, UF[i], and/or a backfilling threshold, BF[i], may be defined for the buffer area of the i-th layer. The underflow threshold, UF[i], may define the minimum buffer fullness level to prevent buffer underflow. The underflow threshold may be defined for an independent layer (e.g., a layer that can be decoded correctly without relying on any other layer) and/or an enhancement layer (e.g., a layer that depends on one or more lower layers for decoding). The base layer may be an independent layer. Other non-base layers may also be independent layers (e.g., in a multi-layer scalable bitstream). Buffer underflow is a critical and undesirable event for an independent layer (e.g., because video playback may stop when underflow happens). Buffer underflow for an enhancement layer (e.g., a non-independent layer) may be acceptable since the streaming device may be able to play back video segments from a lower layer's buffer area that is not underflow, all the way down to the buffer area of the base layer. Accordingly, the UF[i] of an enhancement layer may be set to zero, while the UF[i] of an independent layer may be set to a value greater than zero.

The backfilling threshold, BF[i], may represent the buffer fullness level at which sufficient segments are considered to be available in the i-th layer's buffer area such that the streaming device (e.g., via the buffer adaptation module 406) may fetch a higher layer (e.g., a layer equal to or higher than the (i+1)-th layer) of an earlier segment. For example, the last segment j in the i-th layer buffer may be denoted as S(i, j). When BF[i] is reached, the streaming device may start fetching segments S(1, k), for which 1>i, and k<=j. As such, the backfilling threshold may be a threshold for determining when conditions (e.g., available network bandwidth) may allow the streaming device to backfill a buffer area with higher quality (e.g., from a higher layer) segments from an earlier time period.

Figure 8:
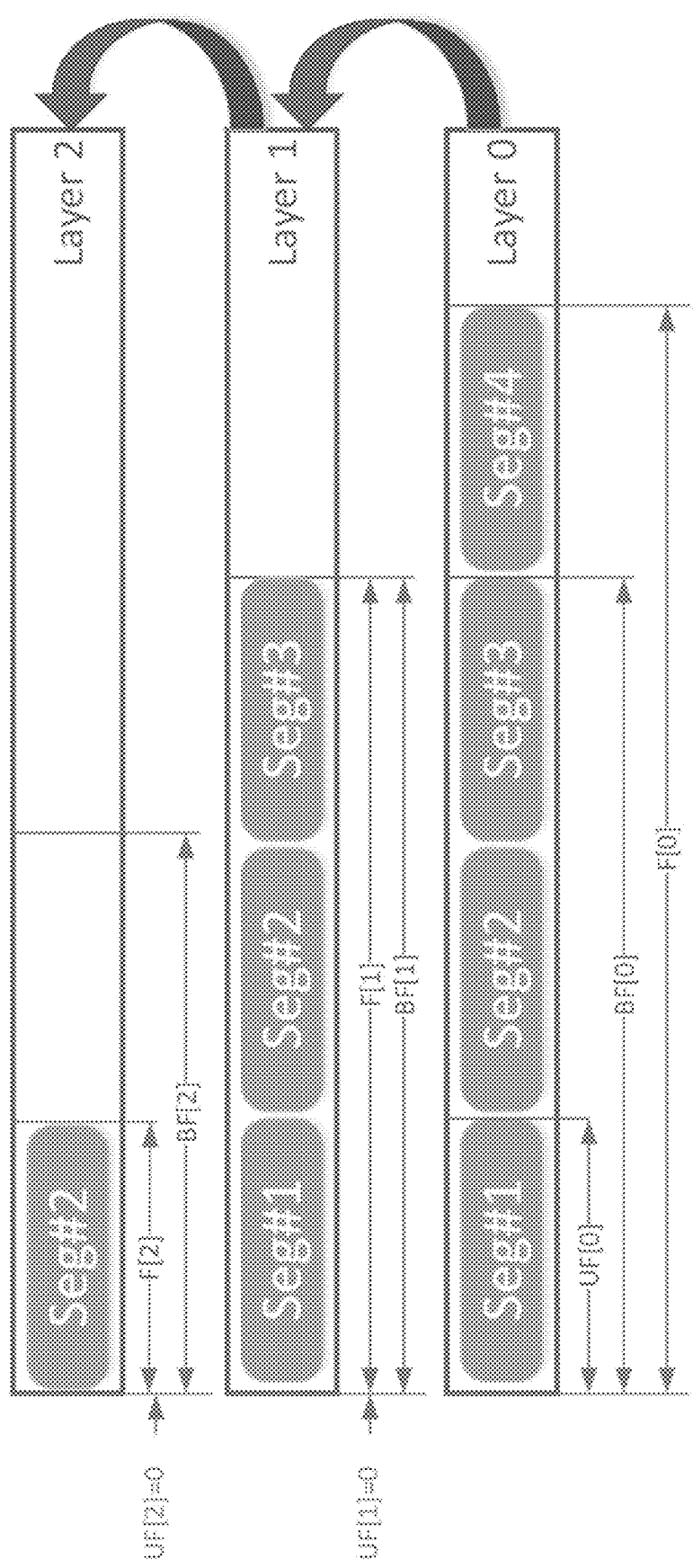
FIG. 8 shows an example three-layer buffer model using two buffer thresholds for scheduling determination.

FIG. 8 shows an example three-layer buffer model using two buffer thresholds for scheduling determination. As shown, layer 2 may depend on layer 1, and layer 1 may depend on layer 0. Layers 1 and 2 may be enhancement layers. The underflow thresholds of layer 1 and layer 2, UF[1] and UF[2], may be set to zero. The buffer fullness of each layer may be determined by the total number of multi-layer segments available in the buffer.

Referring back to FIG. 5, the buffer adaptation module 406 may be coupled to the segment downloader 404 and/or bandwidth estimator 402. As such, the buffer adaptation module 406 may have access to the segment downloader 404 and/or bandwidth estimator 402. At a given decision point, the streaming device (e.g., via the buffer adaptation module 406) may request a segment (e.g., a BL segment or an EL segment) from the streaming server, for example based on the current buffer status and/or the most up-to-date bandwidth estimate. Buffer underflow may occur in a buffer area when a video decoder has fetched so much data from the buffer area for decoding that the remaining data in the buffer area falls below the threshold UF[i]. As described herein, UF[i] may be greater than zero for a base layer buffer or the buffer of an independent non-base layer. For simplification purposes and without loss of generality, the disclosure herein denotes UF[i] as UF. The buffer adaptation module 406 may maintain the number of segments in a buffer area above UF (e.g., to minimize the risk of interrupted playback). For example, when the number of segments in the base-layer buffer area falls below UF, the buffer adaptation module 406 may download one or more base layer segments (e.g., regardless of the available network bandwidth) in order to fill the base layer buffer as soon as possible. After the base-layer buffer area is filled to a level above the underflow threshold, the streaming device may continue to download base layer segments until the number of buffered segments reaches the backfilling threshold BF[0] of the base layer buffer area. At that point, the buffer adaptation module 406 may decide to download one or more earlier segments (e.g., segments with earlier playback time) from a higher quality layer. The buffer adaptation module 406 may decide to download base layer segments with future playback times. The decision may be made based on various factors discussed herein including, for example, an estimated available network bandwidth.

The value of the backfilling threshold may be adjusted, for example to balance between consistent video quality and fast adaptation to bandwidth variations. For instance, with a high backfilling threshold, the streaming device may obtain consistent video playback quality when bandwidth changes, but may not be able to switch to higher quality video quickly when more bandwidth becomes available. On the other hand, with a low backfilling threshold, the streaming device may be able to switch to high quality video more quickly when bandwidth increases, but may suffer from inconsistent service quality when bandwidth fluctuates. The backfilling threshold of a higher layer may be set to a value equal to or less than the backfilling threshold of a lower layer on which the higher layer depends (e.g., BF[i+1]<=BF[i]).

A consideration for download scheduling may be the initial fullness level of the buffer space (e.g., the number of segments buffered before playback may start at the beginning of the streaming process). The level may be configured differently for different applications. For example, a high initial buffer level may result in extra delay for the playback, while a low initial buffer level may not be sufficient to prevent buffer underflow. In some examples (e.g., the video streaming device shown in FIG. 5), the initial buffer level may be set for the base layer buffer only, and playback may start when a number of base layer segments (e.g., M) have been downloaded into the base layer buffer. The value of M may be equal to or greater than UF[0], but less than or equal to BF[0], for example. The streaming device may download M base layer segments into the buffer before starting other operations of the streaming device (e.g., the SHVC Mux and decoder 408 and/or the rendering module 410, as shown in FIG. 5).

To reduce quality variation during playback, the j-th segment of the i-th layer, S(i, j), may be downloaded if the estimated available bandwidth is sufficiently large (e.g., higher than the bitrate of S(i,j)) and the backfilling threshold of one or more lower layers has been reached. As such, the quality of buffered segments may be incrementally enhanced by making sure that a sufficient number of segments from the i-th layer are downloaded before downloading a segment from the (i+1)-th layer. For example, when the buffer fullness of the i-th layer is less than the backfilling threshold BF[i], the streaming device may request to download a segment from the i-th layer instead of a segment from a higher layer (e.g., a k-th layer, where k>i).

When the buffer fullness F[i−1] of the (i−1)-th layer reaches the backfilling threshold BF[i−1], the streaming device (e.g., via the buffer adaptation module 406) may perform buffer backfilling (e.g., to select an appropriate segment from a higher layer such as the i-th layer) based on one or more considerations. These may include, for example, the size of the segment (e.g., S[i, j], which may be measured in terms of bits or bytes), the duration of the segment (T[i, j]), the decoding time of the segment (D[i, j]), and/or the estimated network bandwidth ($BW_{est}[j]$). A segment may be selected such that it may be downloaded completely before being extracted from the buffer for decoding and display. The following formulas and/or figures may illustrate the selection process described herein. For simplicity purposes, the scheduling of segments from the i-th layer are provided herein and the index "i" is omitted from the description.

Figure 9:
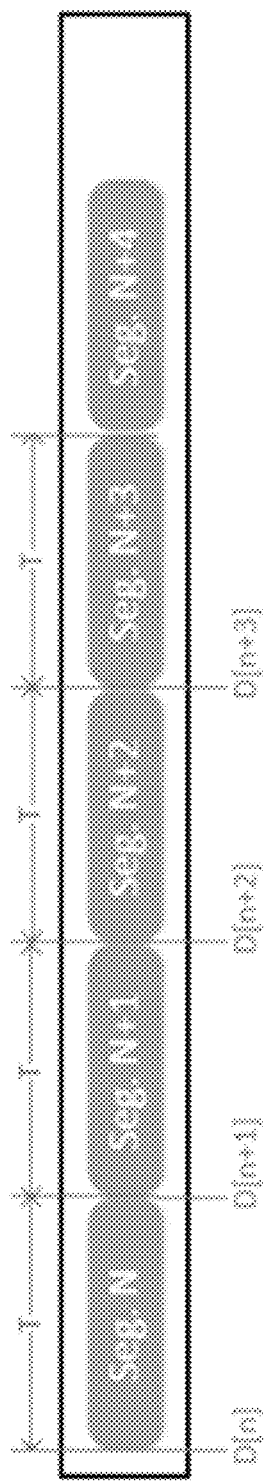
FIG. 9 shows an example of segment downloading and/or decoding.

FIG. 9 shows an example of segment downloading and/or decoding. For illustration purposes, each segment is assumed to have the same duration (T), but may have a same or different segment size (S[j]). The display time D[j] of a segment j may depend on the frame rate at which the corresponding video content is captured. As shown in Equation (4), the display time of the (j+1)-th segment may be estimated based on the display time D[j] of the j-th segment and the duration of the j-th segment:

$$D[j+1]=D[j]+T \qquad (4)$$

Given a current time t, the minimum bandwidth minBW[j] for downloading the j-th segment may be derived by dividing the segment size S[i] by the time between the current time t and the display time D[j] of the j-th segment, as shown in Equation (5) below:

$$minBw[j]=S[j]/(D[j]-t) \qquad (5)$$

The maximum download time (Dw[j]) for the j-th segment may be determined as the difference between the display time D[j] and the current time t (e.g., as D[j]−t). The maximum download time for the (j+1)-th segment may be determined as the difference between the display time for the (j+1)-th segment, D[j+1], and the current time t (e.g., as D[j+1]−t), and further as shown below in Equation (6) (e.g., by substituting D[i]+T for D[j+1]):

$$Dw[j+1]=D[j+1]-t=D[j]+T-t \qquad (6)$$

Accordingly, the minimum bandwidth required to download the (j+1)-th segment, minBW[j+1], may be determined by dividing the segment size of the (j+1)-th segment by the maximum download time of the (j+1)-th segment, as shown in Equation (7).

$$minBW[j+1] = \frac{S[j+1]}{Dw[j+1]} = \frac{S[j+1]}{D[j]+T-t} \qquad (7)$$

Assuming each segment in the given example has approximately the same size S (S[j]≈S[j+1]≈S), the minimum bandwidth for downloading the (j+1)-th segment candidate may be less than the minimum bandwidth for downloading the j-th segment candidate, which may be true at least as the segment index increases. Based on the estimated bandwidth, the streaming device (e.g., via a segment scheduler) may decide to skip one or more segments until the streaming device finds the k-th segment to download, where k is the smallest segment index for which the k-th segment may be downloaded completely before its display time D[k]. More specifically, the minimum bandwidth, minBW[k], for downloading the k-th segment should be less than a recently estimated available network bandwidth $BW_{est}$ (e.g., the latest estimation of the available network bandwidth), as shown in the following formula:

$$BW_{est} \geq minBw[k] \qquad (8)$$

If one or more segments of the i-th layer do not satisfy Equation (8), the streaming device (e.g., via a segment scheduler) may request future segments from a lower layer (e.g., starting from the (i−1)-th layer) until the lower layer buffer is full. After the i-th layer buffer fullness reaches the backfilling threshold BF[i], the streaming device may proceed to request segments in the next higher layer, e.g., the (i+1)-th layer. If the download of an enhancement layer segment has been scheduled but is not completely received before its display time (e.g., due to bandwidth fluctuation), the streaming device may terminate the download of that enhancement layer segment and take a different action. For example, the streaming device may keep the partially downloaded segment (as some access units (AUs) from the segment may still be used) or discard it.

Figure 10:
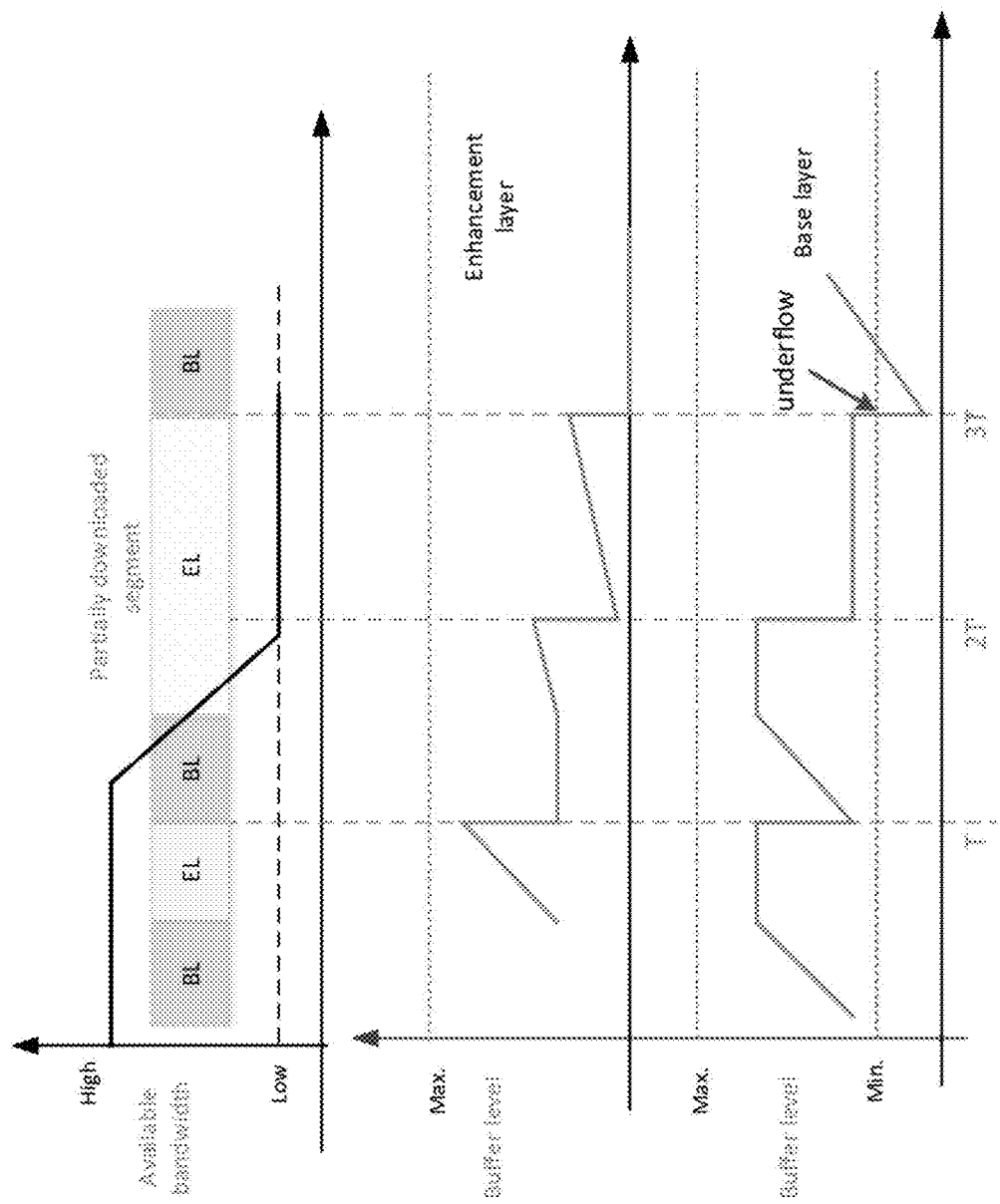
FIG. 10 shows an example scenario where enhancement layer downloads are terminated due to abrupt bandwidth drop during sequential downloading.

FIG. 10 shows an example scenario where enhancement layer downloads are terminated due to abrupt bandwidth drop during sequential downloading. In the example, an EL segment was not delivered in time and the base layer buffer level fell below the underflow threshold (e.g., F[0]<UF). In response, the streaming device may terminate the downloading of the EL segment and request a new BL segment (e.g., as soon as possible). A re-muxing module (e.g., the SHVC Mux and decoder 408 shown in FIG. 5) may extract available AUs from the partially downloaded EL segment, if possible, or may discard the partially downloaded EL segment.

Figure 11:
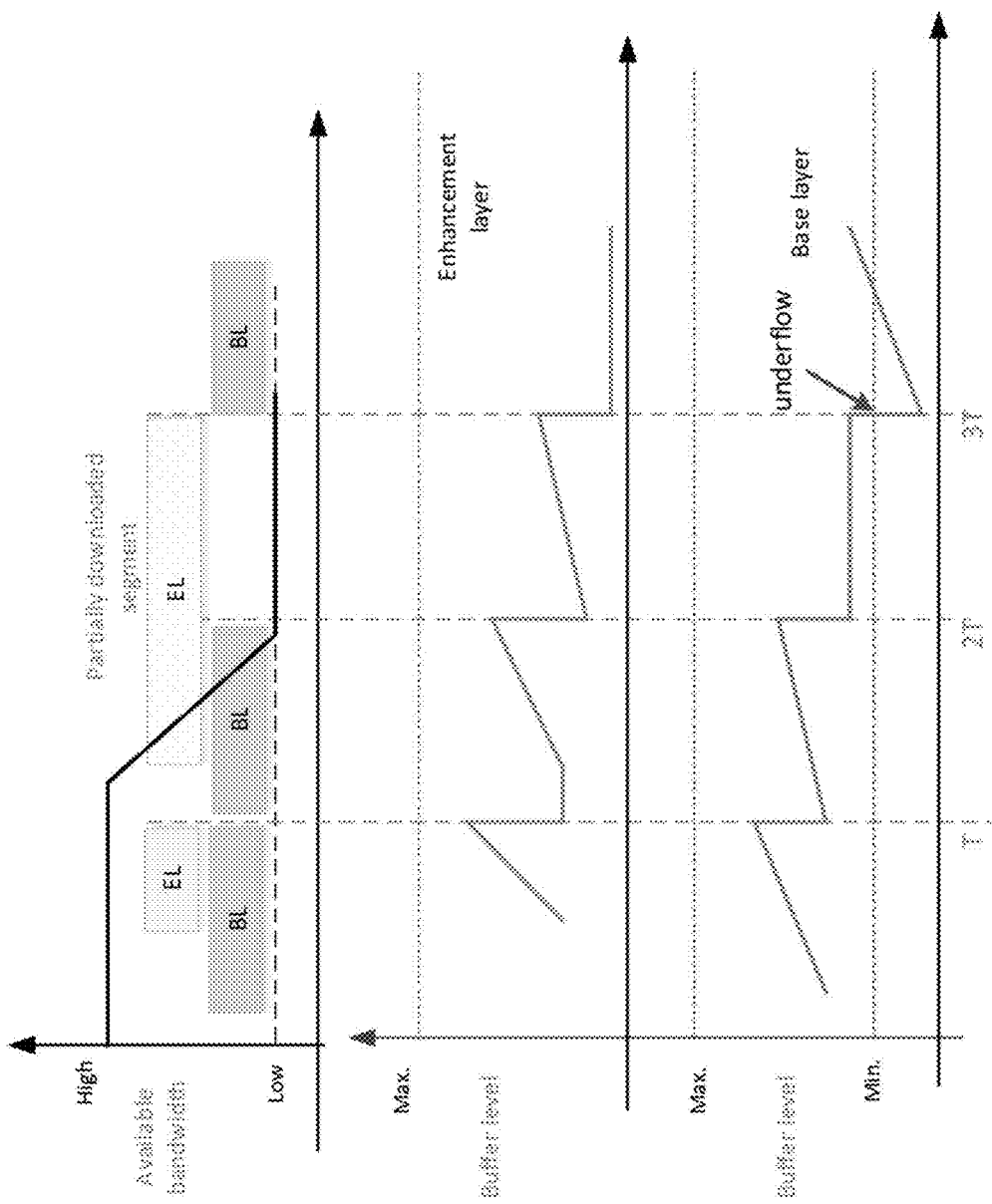
FIG. 11 shows an example scenario where enhancement layer downloads are terminated due to abrupt bandwidth drop during parallel downloading.

FIG. 11 shows an example scenario where enhancement layer downloads are terminated due to an abrupt bandwidth drop during parallel downloading. In such a situation, since multiple segments may be requested simultaneously, layer dependency may be considered. For example, the base layer segment may not be downloaded completely, and as a result, simultaneously downloaded enhancement layer segments may not be decoded correctly and the bandwidth used to download the enhancement layer segments may be wasted. Accordingly, the scheduler may continue to download segments from the current layer and may not switch to higher layer download until, for example, sufficient number of segments of the current layer have been buffered.

Figure 12:
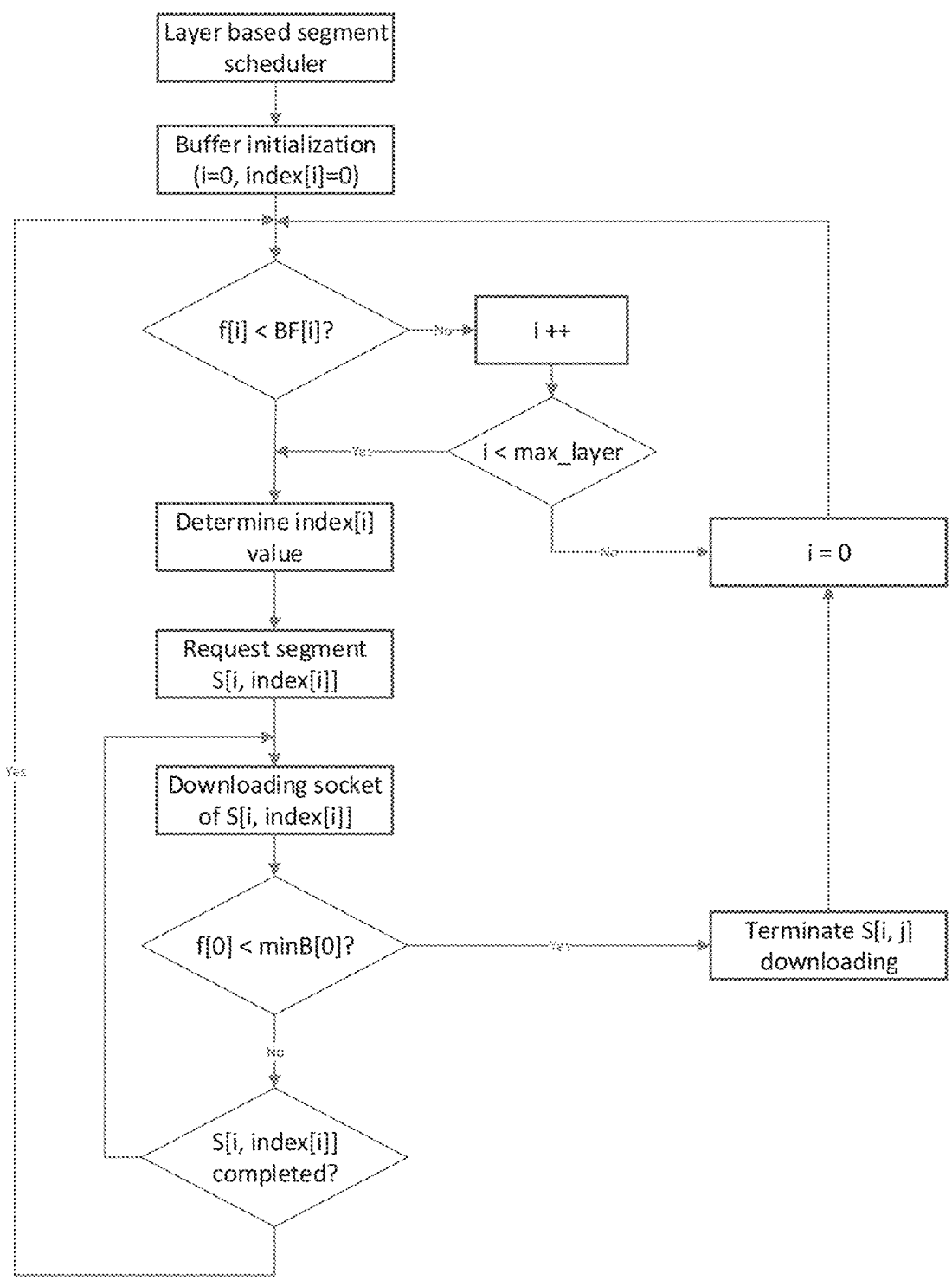
FIG. 12 shows a flowchart for an example of buffer adaptation scheduling.

FIG. 12 shows a flowchart for an example of buffer adaptation scheduling. Using the example technique shown in FIG. 12, a streaming device may decide the index of the next segment to download, and may request/download the segment accordingly. The index of a layer may be denoted as i (e.g., i=0 may indicate that the layer is a base layer and i>0 may indicate that the layer is an enhancement layer). The segment indices of the i-th layer may be denoted as index[i]. The buffer space may be initialized first (e.g., starting with a base layer buffer area or i=0). The fullness of the buffer area, f[i], may be compared with a backfilling threshold BF[i] associated with the buffer area. If the backfilling threshold has been reached, processing may move to a high layer buffer area (e.g., i=i+1) provided that the highest layer buffer area has not been completed yet. If the highest layer buffer area has been completed, processing may restart from the base layer (e.g., by setting i=0). If the backfilling threshold BF[i] has not been reached, the streaming device may determine the index of the next segment to request for layer i. The segment, S[i, index[i]], may be requested/downloaded. During the segment download, the fullness of the corresponding buffer area may be examined when a socket (e.g., each socket) of the segment is received. If the buffer area is underflow (e.g., f[i]<minB[i]), the streaming device may terminate the segment download (e.g., by submitting a STOP request to the server), and begin to download a base layer segment (e.g., by setting i=0). If the buffer area is not in an underflow state (e.g., f[i]>=minB[i]), the streaming device may continue to download the segment, S[i, index[i]], until completion. At that point, the streaming device may again check the fullness of the buffer area, and may repeat the process described herein. The streaming device may examine the fullness of the base layer buffer area periodically (e.g., even while a segment is being downloaded).

Figure 13:
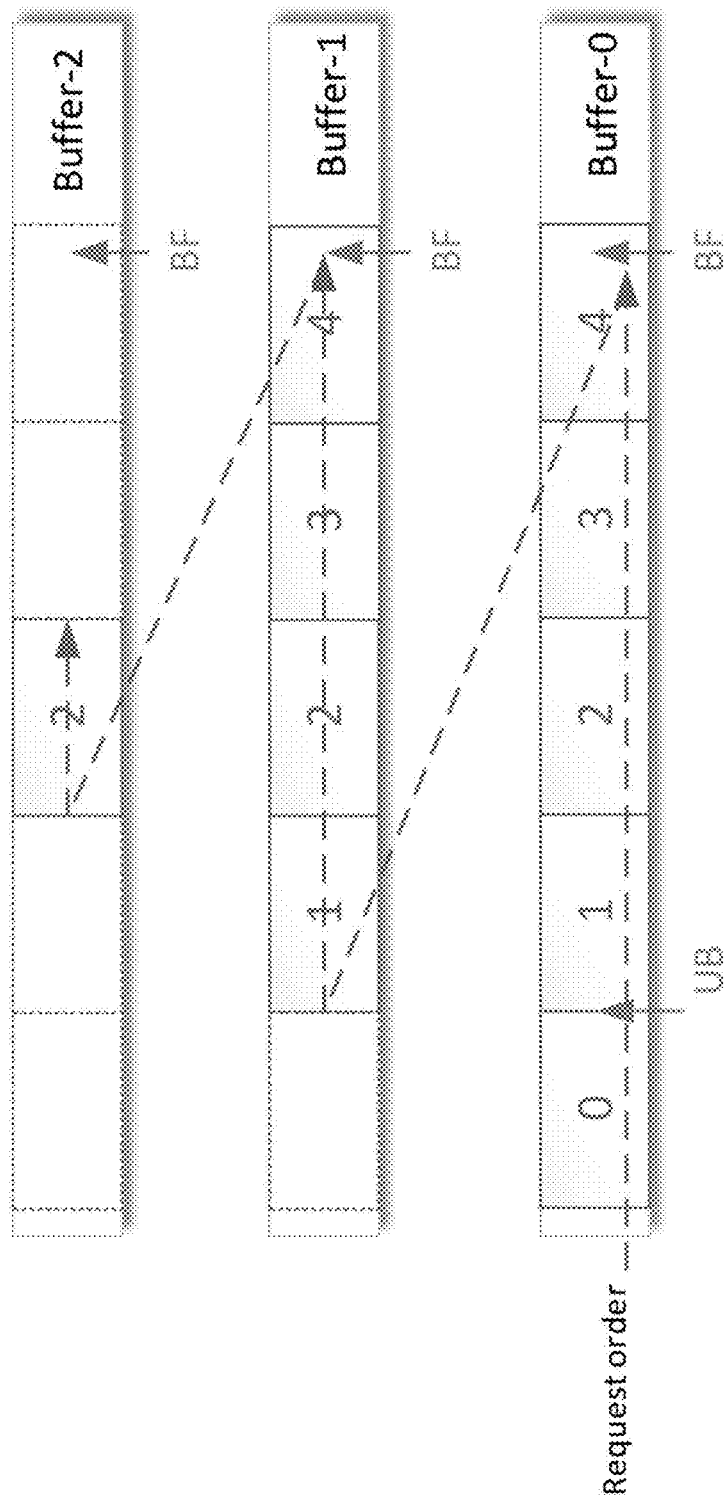
FIG. 13 shows an example of segment backfilling.

FIG. 13 shows an example of segment backfilling. The dashed line shows an example segment request/download order. For simplicity, it is assumed here that the backfilling threshold for each layer is identical (e.g., BF[i] may be simply referred to as BF). As shown in the example, a scheduler may first request base layer segments until the BL buffer, Buffer-0, reaches its backfilling threshold (e.g., F[0] >BF). The streaming device may request one or more segments from a first enhancement layer for which a corresponding base layer segment has already been downloaded. The enhancement layer segments may improve the quality of previously downloaded content (e.g., the four base layer segments in Buffer-0) since the streaming device may now be able to play back the higher-quality segments instead of the base layer segments. When the first enhancement layer buffer (e.g., Buffer-1) reaches its backfilling threshold (e.g., F[1]>BF), the scheduler may select segments from a second enhancement layer with an even higher quality. For example, the schedule may select the second segment of the second enhancement layer to download based on Equation (7). Using the example techniques described herein, continuous playback may be accomplished when there is enough bandwidth to accommodate base layer bitrates. When extra bandwidth becomes available, it may be utilized to download enhancement layer segments. As such, re-buffering caused by inaccurate bandwidth estimation may be reduced.

As described herein, the buffer adaptation scheduler may select the j-th segment of the i-th layer based on one or more factors including, for example, estimated network bandwidth, layer dependency, the size and/or display time of a segment, etc. Different video segments, however, may contain different contents, some of which may be more important or artistically interesting than others. For example, in a 2-hour movie, the last 20 minutes may include a climactic scene, and thus be more interesting to the consumer. A ranking (e.g., a high artistic interest value) may be given to a video segment associated with the last 20 minutes of the movie indicating the segment's importance to a streaming device. Such a ranking (e.g., an artistic interest indicator) may be added to the high level data model of DASH. For example, the artistic interest indicator may be added as an additional parameter to the MPD file described herein. A content producer may have control over how to set the value of this artistic interest indicator for one or more video segments (e.g., for each video segment), for example when the video content is created on the server for streaming. A user interface may be provided (e.g., on a content preparation server) via which the content producer may assign artistic interest values to one or more video segments.

The artistic interest indicators may have different levels of granularity. For example, content producer A may use binary values for the artistic interest indicators (e.g., with 0 indicating normal interest and 1 indicating high interest). Content producer B may use a 0-5 or 0-10 scale for the artistic interest indicators, with higher values indicating higher artistic interest.

During scheduling, the streaming device may give higher priority to those segments with higher artistic interest values. More specifically, the streaming device may take into account the artistic interest associated with each video segment, and request those segments with higher artistic interest values ahead of the segments with lower artistic interest values. For example, if a sufficient number of base layer segments have already been downloaded into the base layer buffer (e.g., such that the fullness of the buffer reaches or exceeds the backfilling threshold of the buffer), the scheduler may, under the buffer adaption techniques and layer dependency considerations described herein, determine that the i-th layer of a j-th segment should be downloaded next. The scheduler may recognize (e.g., based on information in the MPD file) that a different segment (e.g., which may include a climactic scene) has been given a higher artistic interest value than the j-th segment. Accordingly, the scheduler may attempt to download the segment with the higher artistic interest value (e.g., a segment from the climactic scene) next instead of the i-th layer of the j-th segment. The high artistic interest segment may have been encoded into multiple layers with varying qualities (e.g., a base layer and one or more enhancement layers, as described herein), or into a single high-quality layer. The streaming device may give priority to one of the layers of the high artistic interest segment, or to all of the layers of the high artistic interest segment, over a low/regular artistic interest segment. After the high artistic interest segments have been downloaded, the streaming device may revert to downloading other video segments, for example, in accordance with the buffer adaptation scheduling techniques described herein.

The client may prioritize future segments based on an indicated artistic interest value (e.g., regardless of how far in the future those segments occur). For example, if the segments corresponding to the last 20 minutes of a movie are indicated to be of high artistic interest value, the client may prioritize the advanced caching of high quality versions of those segments (e.g., regardless of the current streaming and playback position of the client within the movie). Such a client may begin streaming the movie and may initially dedicate the available bandwidth to requesting and buffering base layer segments (e.g., from the beginning of the movie to the point where the underflow threshold of the base buffer area is satisfied). Once the underflow threshold is satisfied and playback has begun, the client may continue to maintain the buffer above the underflow threshold by requesting additional base layer segments for the content near the current playback position, while using excess bandwidth to begin requesting the high quality segments (e.g., multiple layers or a single simulcast layer) of the last 20 minutes of the movie in order to cache these high quality segments in advance. When the content marked with high artistic interest indications has been cached at high quality in advance, the client may revert to the normal scheduling algorithm (e.g., based on both underflow and backfilling thresholds).

The client may prioritize future segments of high artistic interest values based on an artistic interest priority window size. Such a window may indicate how far in advance of the current playback time or playback buffering horizon segments corresponding to content with a high artistic interest should be prioritized for advanced caching. For example, the client may have an artistic interest priority window size of 180 seconds. Such a client may look into the future 180 seconds beyond the current playback time or beyond the latest time for which content is available in a near-term playback cache, and may prioritize for advance caching high quality content (e.g., which has a high artistic interest indication) within that window. If the segments corresponding to the last 20 minutes of a movie are indicated to be of high artistic interest, the client may use a normal scheduling algorithm (e.g., based on underflow and backfilling thresholds, as disclosed herein) from the beginning of the movie until it reaches the point of playing back and/or buffering content 23 minutes before the end of the movie (i.e., 180 seconds before the start of the content indicated to be of high artistic intent). At this point, the client may determine that there is high artistic interest content within an artistic interest priority window (e.g., which may be a sliding window) that spans 180 seconds into the future. In response, the client may prioritize the advanced caching of high quality versions of the high artistic interest segments that fall within the artistic interest priority window. The client may continue to maintain the playback buffer above the underflow threshold by requesting additional base layer segments for the content near the current playback position, while using excess bandwidth to request the high quality segments (e.g., multiple layers or a single simulcast layer) for the high artistic interest content (e.g., in order to cache these high quality segments in advance). When the high artistic interest content within the sliding artistic interest priority window has been cached, the client may revert to the normal scheduling algorithm (e.g., based on both underflow and backfilling thresholds). The value for artistic interest priority window size may be set by a content producer (e.g., it may be transmitted to the client as a parameter in a media description such as an MPD file). The value for artistic interest priority window size may be determined by a client (e.g., a client may use a fixed value such as 60 seconds, 180 seconds, ten minutes, etc.).

Layered segments with high artistic interest values may be stored on the streaming device (e.g., in the buffer space described herein). The streaming device may decide how much high artistic interest content to pre-fetch and/or store based on various considerations including, for example, the streaming device's storage capacity. The streaming device may set a threshold for the amount of data (e.g., in units of megabytes) to pre-fetch and/or store. The threshold may be a function of the artistic interest values assigned to various parts of the video content (e.g., the higher the artistic interest value, the more data to pre-fetch and/or store).

Scalable coding may reduce server storage requirements (e.g., in a HAS streaming system), for example since it may not be necessary to store multiple representations of the same content with varying qualities. When a streaming device is configured to receive higher quality representations in addition to a base layer representation, bandwidth usage may increase in the downlink because receiving two or more layers may consume more bandwidth than receiving a single layer. For a video segment tagged with a high artistic interest value, the streaming device may desire a higher quality representation than the base layer representation. More bandwidth may thus be consumed to download both the base layer representation and the higher quality representation (e.g., an enhancement layer representation) for high artistic interest content.

A hybrid coding scheme may be used to prepare video content. For example, scalable coding may be applied to video segments with normal (e.g., low) artistic interest values so that those segments may be coded into multi-layered segments with layer dependencies. HEVC simulcast coding may be applied to video segments with high artistic interest values so that those segments may be coded into single-layer, high quality segments, and a streaming device may directly request the single-layer segments.

Figure 14:
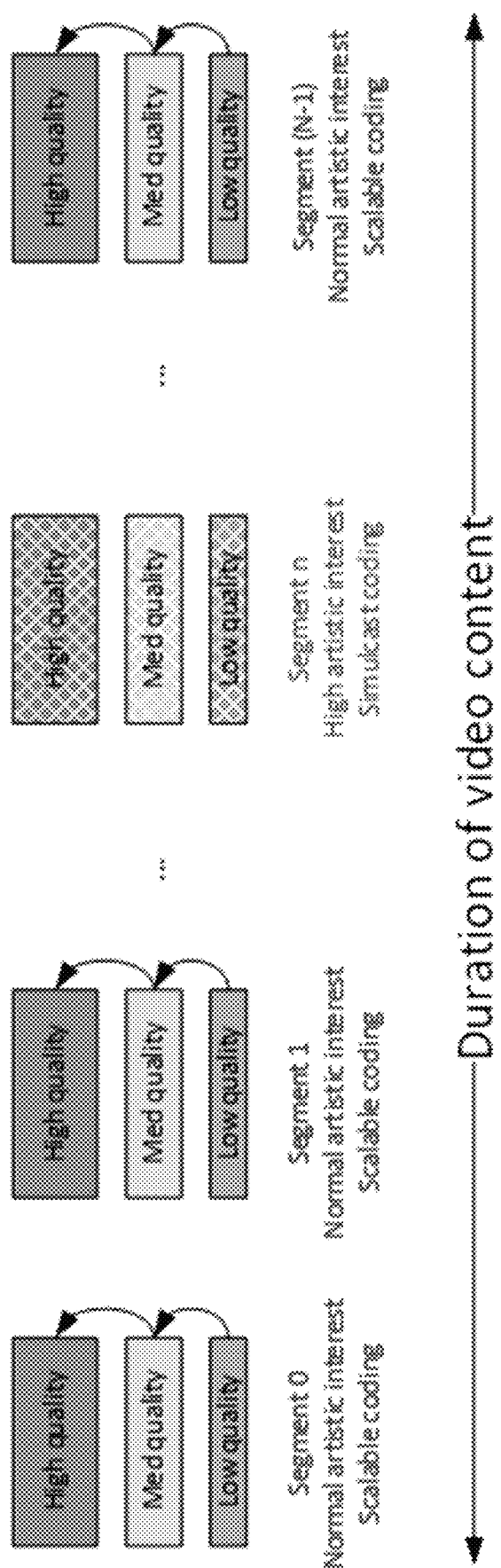
FIG. 14 shows an example of content preparation using mixed simulcast and scalable coding.
Figure 15:
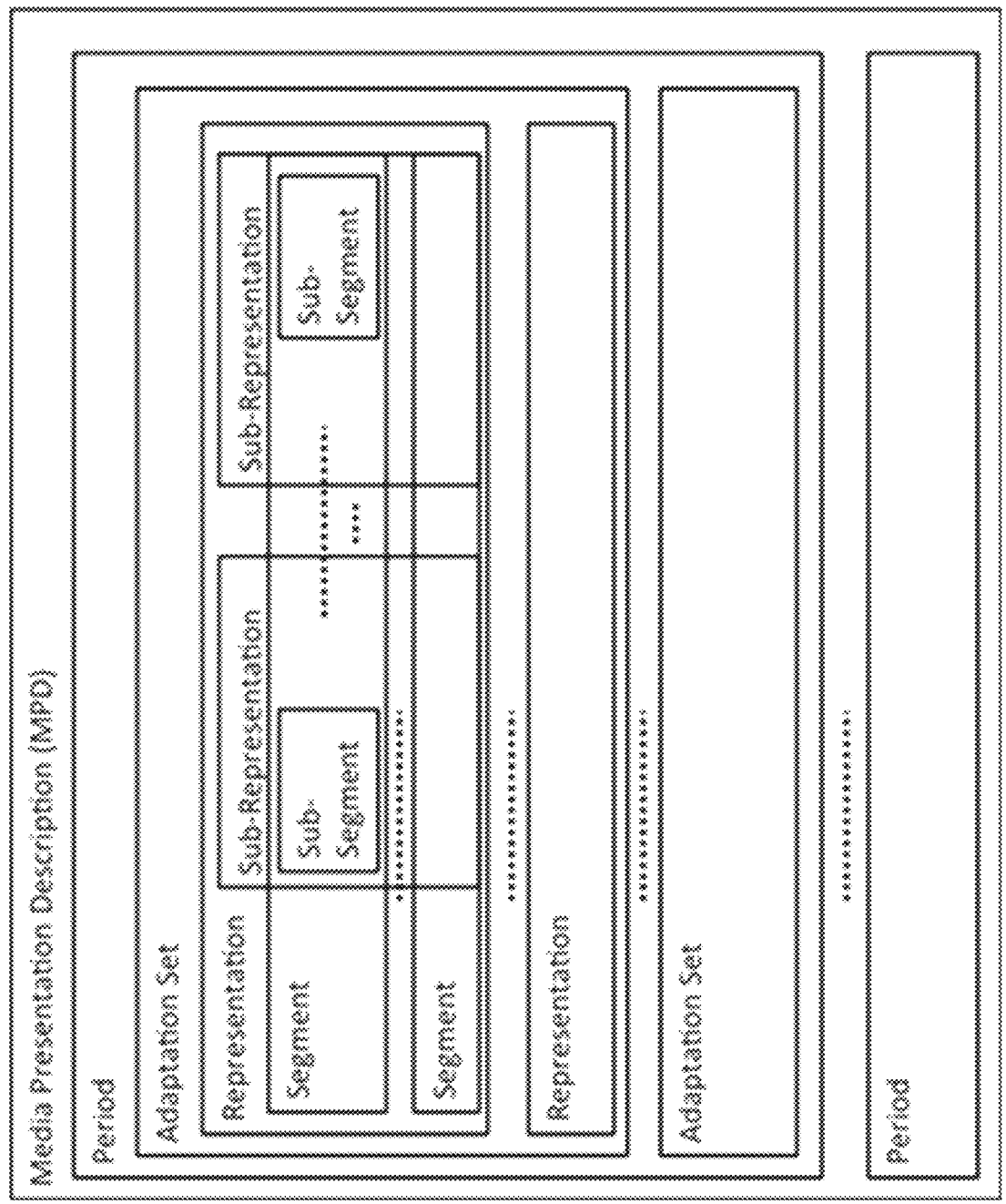
FIG. 15 shows an example Dynamic Adaptive Streaming for HTTP (DASH) high level data model.

Mixed use of simulcast and scalable coding may achieve a tradeoff between server storage reduction and downlink traffic increase. FIG. 14 shows an example of content preparation using mixed simulcast and scalable coding. The n-th segment in the example may have high artistic interest, and the other segments may have normal artistic interest. A single-layer (e.g., a medium or high quality layer) or multi-layer (e.g., low quality, medium quality, and high quality layers) representation of the n-th segment may be created via simulcast coding (e.g., without layer dependency and/or inter layer prediction). The other segments may be coded via scalable coding with layer dependency (e.g., the high quality layer may be dependent on the medium quality layer, and the medium quality layer may be dependent on the low quality layer). Although the example in FIG. 14 shows that the segments are coded into three representations (e.g., low quality, medium quality, and high quality), any number of representations may be created for the segments in real practice. For example, the n-th segment, which has a high artistic interest, may be coded only in medium and high representations, and not in low representation.

The DASH standard may be adapted to support the hybrid scalable and simulcast content preparation scheme described herein. For example, along the timeline of the video content, layer dependency information may be signaled for the segments at different time positions. For the example depicted in FIG. 14, the DASH MPD file may indicate that layer dependency exists for all N segments except the n-th segment. For the n-th segment, the DASH MPD file may indicate that there is no layer dependency among the layers representing low, medium, and high quality. When the streaming device is ready to fetch the n-th segment, it may request the highest quality representation, without requesting the two lower representations first.

The hybrid scalable and simulcast content preparation scheme may be supported on the server side. For example, a streaming device may not know that there is no layer dependency for a particular segment (e.g., a high artistic interest segment). When fetching the n-th segment, the streaming device may request all three layers in order to receive the highest quality video. On the server side, an intelligent server may be aware of the fact that the n-th segment has been encoded via simulcast coding, and therefore send only the highest layer to the streaming device (e.g., without sending the lower layers requested by the streaming device). In such situations, even though the streaming device may receive only the highest layer, the streaming device may still be able to decode and display the n-th segment because the decoding of a higher layer coded with simulcast techniques may not depend on the decoding of lower layers. It should be noted that the artistic interest indication scheme described herein may be applied in conventional HAS segment scheduling and streaming systems (e.g., one that does not use scalable video codec).

The artistic interest indication may be implemented within a DASH MPD, e.g., at the representation, segment and/or sub-segment levels, to indicate various values of artistic interest. On the representation level, the following example syntax element may be signaled to set interest values for a number of time periods within the video content. "O" may indicate that an element or attribute is optional:

| Element or Attribute Name | Use | Description |
| --- | --- | --- |
| ArtisticInfo | O | Specifies a set of video segments with respective assigned artistic interest values |

The semantics of the elements and attributes within the ArtisticInfo element may be as shown in Table 2, where "O" may indicate that an element or attribute is optional:

TABLE 2

Example syntax for indicating artistic interest values

| Element or Attribute Name | Use | Description |
| --- | --- | --- |
| InterestInterval | 1 . . . N | Specifies an interval or segment along the timeline of the video content |
| @interestValue | O | Specifies the artistic interest value associated with the interval or segment defined by @interestStart and @interestDuration. If not present, the value is 0 |
| @timescale | O | Specifies the timescale (e.g., in units per seconds) that may be used to derive real-time duration values. If not present, the value of the @timescale attribute of the containing Representation may be used. If not present at any level, the value is set to 1. |
| @interstStart | O | Specifies the start time of the interval or segment |
| @interestDuration | O | Specifies the duration of the interval or segment. The value of the duration in seconds may be derived by dividing the value of this attribute by the value of @timescale |

An example DASH implementation may include the following. Timescale may be ticks per second. A first interval/segment may start from the 30th second of a movie to the 90th second of the movie, with an interest value of "3" (e.g., using a 0-5 scale with 0 representing normal interest and 5 representing highest interest). A second interval/segment may start from the 100th second of the movie to the 140th second of the movie, with an interest value of "2."

```
<ArtisticInfo>
    <InterestInterval interestValue="3" timescale="90000"
    interestStart="2700000"
 interestDuration="5400000"/>
    <InterestRegion interestValue="2" timescale="90000"
    interestStart="9000000"
 interestDuration="3600000"/>
    </ArtisticInfo>
```

On the segment or sub-segment level, the following attribute may be added to the SegmentURL syntax element within SegmentList. The attribute may be used to set an artistic interest value for a particular segment or sub-segment, where "O" may indicate that the attribute is optional:

| Element or Attribute Name | Use | Description |
| --- | --- | --- |
| @interestValue | O | Specifies the artistic interest value for the segment. If not present, the value is 0 |

Example syntax may be shown in the following SegmentList element, which may be within a Representation element in the MPD. In the example, an artistic interest of "5" is assigned to the second segment:

```
<SegmentList duration="10">
  <SegmentURL media="seg-01.mp4"/>
  <SegmentURL interestValue="5" media="seg-02.mp4"/>
  <SegmentURL media="seg-03.mp4"/>
</SegmentList>
```

Although not shown in the examples provided herein, other elements and attributes may be included in the MPD syntax. For example, the bitrates at which one or more video segments have been encoded may be indicated in the MPD file so that the streaming device may determine whether an estimated available network bandwidth is sufficient for downloading those video segments.

Figure 16A:
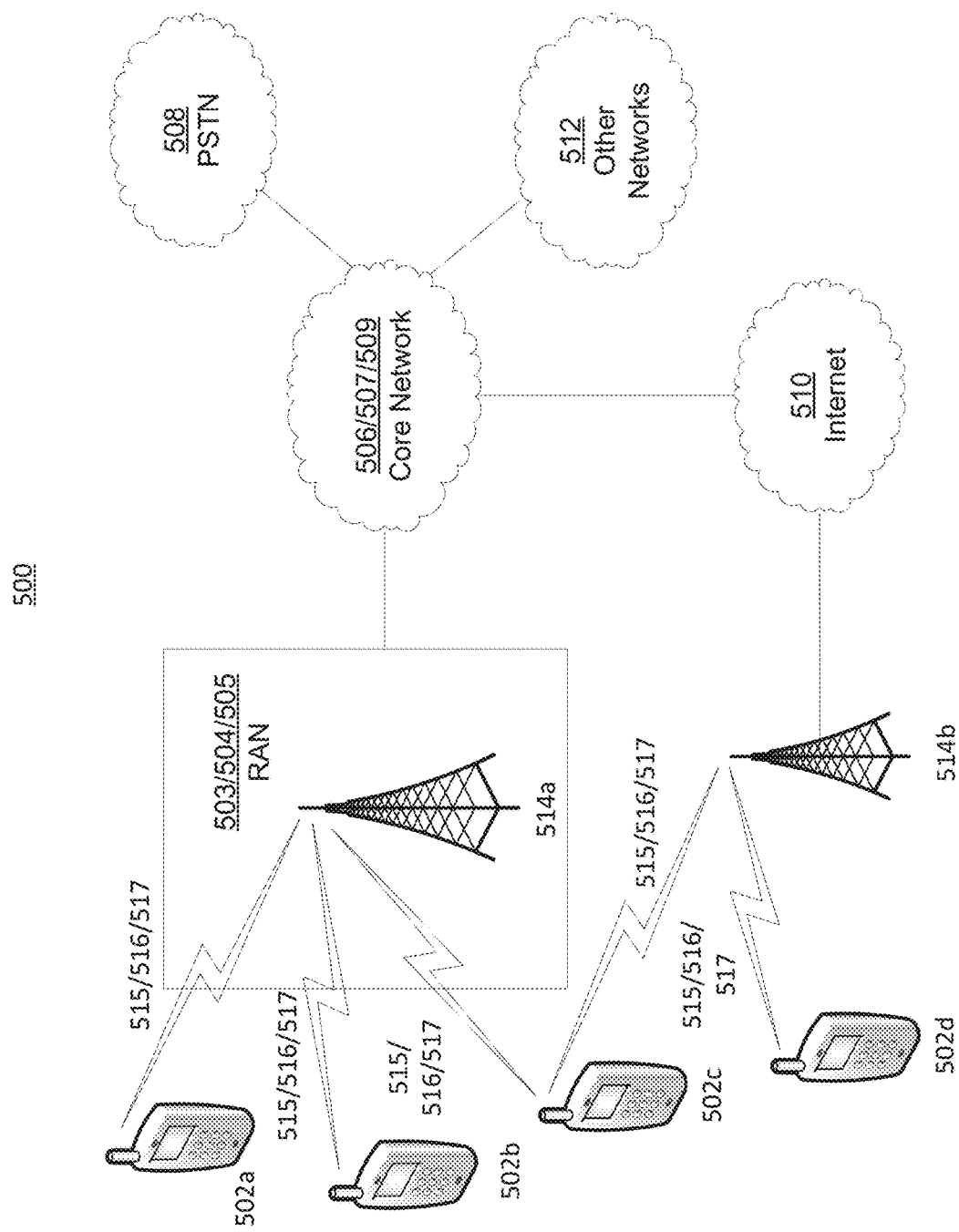
FIG. 16A depicts a diagram of an example communications system in which one or more disclosed embodiments may be implemented.

FIG. 16A depicts a diagram of an example communications system 500 in which one or more disclosed embodiments may be implemented and/or may be used. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 16A, the communications system 500 may include wireless transmit/receive units (WTRUs) 502a, 502b, 502c, and/or 502d (which generally or collectively may be referred to as WTRU 502), a radio access network (RAN) 503/504/505, a core network 506/507/509, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, and/or 502d may be any type of device configured to operate and/or communicate in a wireless environment. By way of example, the WTRUs 502a, 502b, 502c, and/or 502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 500 may also include a base station 514a and a base station 514b. Each of the base stations 514a, 514b may be any type of device configured to wirelessly interface with at least one of the WTRUs 502a, 502b, 502c, and/or 502d to facilitate access to one or more communication networks, such as the core network 506/507/509, the Internet 510, and/or the networks 512. By way of example, the base stations 514a and/or 514b may be a base transceiver station (BTS), a Node-B, an eNode B, a Home Node B, a Home eNode B, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 503/504/505, which may also include other base stations and/or network elements (not shown), such as a base station controller (BSC), a radio network controller (RNC), relay nodes, etc. The base station 514a and/or the base station 514b may be configured to transmit and/or receive wireless signals within a particular geographic region, which may be referred to as a cell (not shown). The cell may further be divided into cell sectors. For example, the cell associated with the base station 514a may be divided into three sectors. Thus, in one embodiment, the base station 514a may include three transceivers, i.e., one for each sector of the cell. In another embodiment, the base station 514a may employ multiple-input multiple output (MIMO) technology and, therefore, may utilize multiple transceivers for each sector of the cell.

The base stations 514a and/or 514b may communicate with one or more of the WTRUs 502a, 502b, 502c, and/or 502d over an air interface 515/516/517, which may be any suitable wireless communication link (e.g., radio frequency (RF), microwave, infrared (IR), ultraviolet (UV), visible light, etc.). The air interface 515/516/517 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 503/504/505 and the WTRUs 502a, 502b, and/or 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 514a and the WTRUs 502a, 502b, and/or 502c may implement a radio technology such as Evolved UMTS Terrestrial Radio Access (E-UTRA), which may establish the air interface 515/516/517 using Long Term Evolution (LTE) and/or LTE-Advanced (LTE-A).

In other embodiments, the base station 514a and the WTRUs 502a, 502b, and/or 502c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 16A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 514b and the WTRUs 502c, 502d may implement a radio technology such as IEEE 802.11 to establish a wireless local area network (WLAN). In another embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, etc.) to establish a picocell or femtocell. As shown in FIG. 16A, the base station 514b may have a direct connection to the Internet 510. Thus, the base station 514b may not be required to access the Internet 510 via the core network 506/507/509.

The RAN 503/504/505 may be in communication with the core network 506/507/509, which may be any type of network configured to provide voice, data, applications, and/or voice over internet protocol (VoIP) services to one or more of the WTRUs 502a, 502b, 502c, and/or 502d. For example, the core network 506/507/509 may provide call control, billing services, mobile location-based services, pre-paid calling, Internet connectivity, video distribution, etc., and/or perform high-level security functions, such as user authentication. Although not shown in FIG. 16A, it will be appreciated that the RAN 503/504/505 and/or the core network 506/507/509 may be in direct or indirect communication with other RANs that employ the same RAT as the RAN 503/504/505 or a different RAT. For example, in addition to being connected to the RAN 503/504/505, which may be utilizing an E-UTRA radio technology, the core network 506/507/509 may also be in communication with another RAN (not shown) employing a GSM radio technology.

The core network 506/507/509 may also serve as a gateway for the WTRUs 502a, 502b, 502c, and/or 502d to access the PSTN 508, the Internet 510, and/or other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and the internet protocol (IP) in the TCP/IP internet protocol suite. The networks 512 may include wired or wireless communications networks owned and/or operated by other service providers. For example, the networks 512 may include another core network connected to one or more RANs, which may employ the same RAT as the RAN 503/504/505 or a different RAT.

Some or all of the WTRUs 502a, 502b, 502c, and/or 502d in the communications system 500 may include multi-mode capabilities, i.e., the WTRUs 502a, 502b, 502c, and/or 502d may include multiple transceivers for communicating with different wireless networks over different wireless links. For example, the WTRU 502c shown in FIG. 16A may be configured to communicate with the base station 514a, which may employ a cellular-based radio technology, and with the base station 514b, which may employ an IEEE 802 radio technology.

Figure 16B:
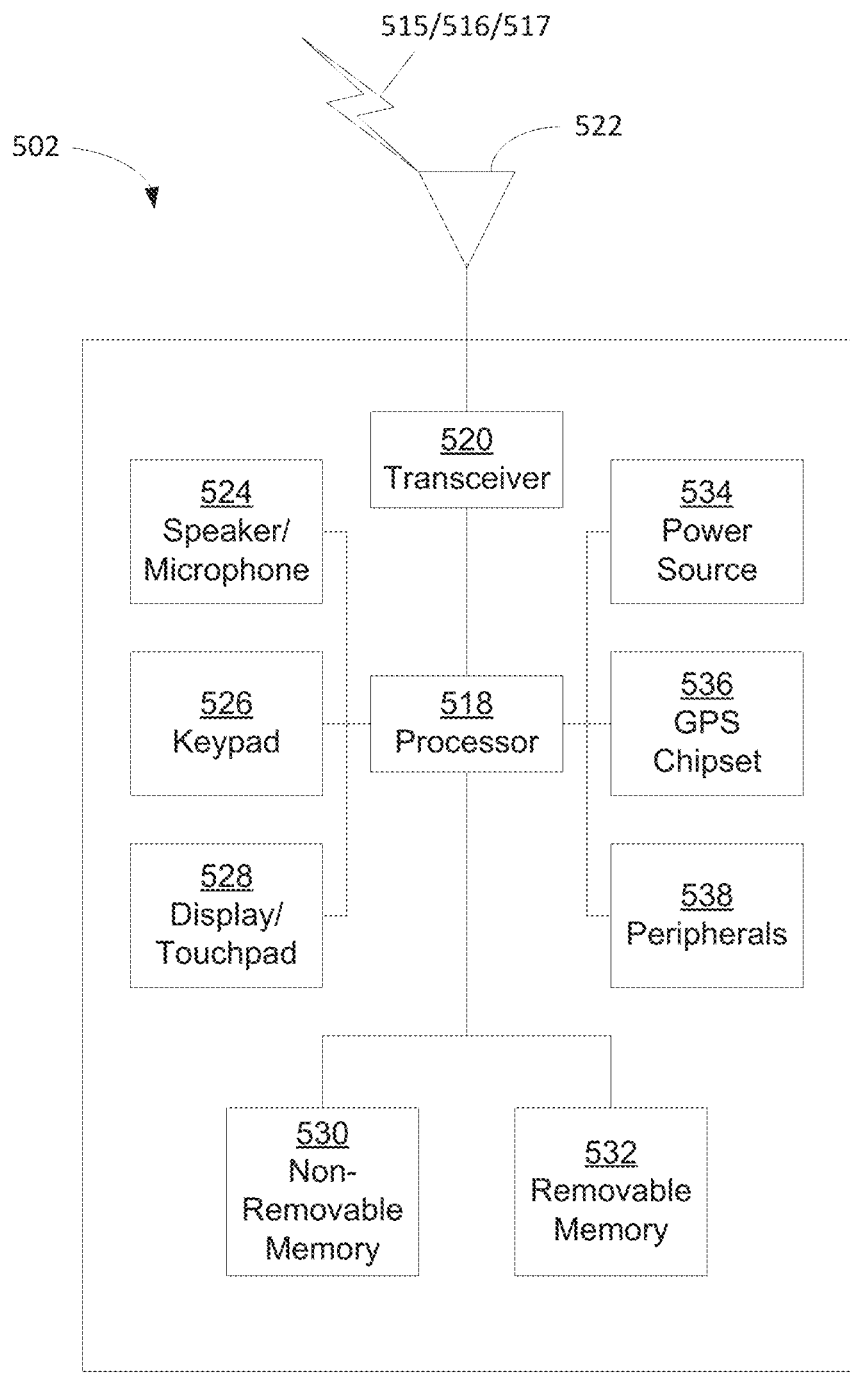
FIG. 16B depicts a system diagram of an example wireless transmit/receive unit (WTRU) that may be used within the communications system illustrated in FIG. 16A.

FIG. 16B depicts a system diagram of an example WTRU 502. As shown in FIG. 16B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and other peripherals 138. It will be appreciated that the WTRU 502 may include any subcombination of the foregoing elements while remaining consistent with an embodiment. Also, embodiments contemplate that the base stations 514a and 514b, and/or the nodes that base stations 514a and 514b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 16B and described herein.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 16B depicts the processor 518 and the transceiver 520 as separate components, it may be appreciated that the processor 518 and the transceiver 520 may be integrated together in an electronic package or chip.

The transmit/receive element 522 may be configured to transmit signals to, or receive signals from, a base station (e.g., the base station 514a) over the air interface 515/516/517. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, for example. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 16B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 515/516/517.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD)

memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 515/516/517 from a base station (e.g., base stations 514a, 514b) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16C:
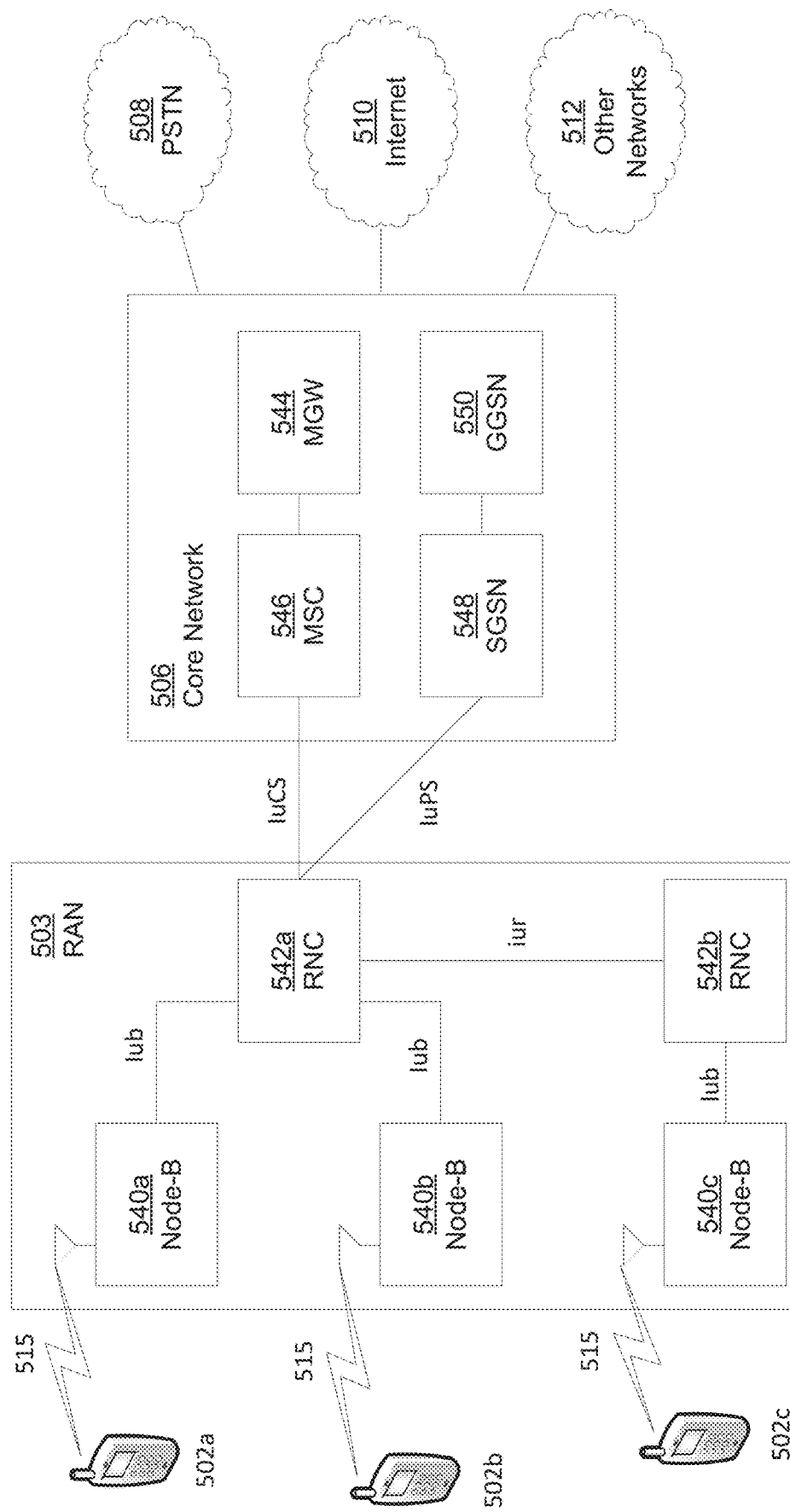
FIG. 16C depicts a system diagram of an example radio access network and an example core network that may be used within the communications system illustrated in FIG. 16A.

FIG. 16C depicts a system diagram of the RAN 503 and the core network 506 according to an embodiment. As noted above, the RAN 503 may employ a UTRA radio technology to communicate with the WTRUs 502a, 502b, and/or 502c over the air interface 515. The RAN 503 may also be in communication with the core network 506. As shown in FIG. 16C, the RAN 503 may include Node-Bs 540a, 540b, and/or 540c, which may each include one or more transceivers for communicating with the WTRUs 502a, 502b, and/or 502c over the air interface 515. The Node-Bs 540a, 540b, and/or 540c may each be associated with a particular cell (not shown) within the RAN 503. The RAN 503 may also include RNCs 542a and/or 542b. It will be appreciated that the RAN 503 may include any number of Node-Bs and RNCs while remaining consistent with an embodiment.

As shown in FIG. 16C, the Node-Bs 540a and/or 540b may be in communication with the RNC 542a. Additionally, the Node-B 540c may be in communication with the RNC 542b. The Node-Bs 540a, 540b, and/or 540c may communicate with the respective RNCs 542a, 542b via an Iub interface. The RNCs 542a, 542b may be in communication with one another via an Iur interface. Each of the RNCs 542a, 542b may be configured to control the respective Node-Bs 540a, 540b, and/or 540c to which it is connected. In addition, each of the RNCs 542a, 542b may be configured to carry out or support other functionality, such as outer loop power control, load control, admission control, packet scheduling, handover control, macrodiversity, security functions, data encryption, and the like.

The core network 506 shown in FIG. 16C may include a media gateway (MGW) 544, a mobile switching center (MSC) 546, a serving GPRS support node (SGSN) 548, and/or a gateway GPRS support node (GGSN) 550. While each of the foregoing elements are depicted as part of the core network 506, it will be appreciated that any one of these elements may be owned and/or operated by an entity other than the core network operator.

The RNC 542a in the RAN 503 may be connected to the MSC 546 in the core network 506 via an IuCS interface. The MSC 546 may be connected to the MGW 544. The MSC 546 and the MGW 544 may provide the WTRUs 502a, 502b, and/or 502c with access to circuit-switched networks, such as the PSTN 508, to facilitate communications between the WTRUs 502a, 502b, and/or 502c and traditional land-line communications devices.

The RNC 542a in the RAN 503 may also be connected to the SGSN 548 in the core network 506 via an IuPS interface. The SGSN 548 may be connected to the GGSN 550. The SGSN 548 and the GGSN 550 may provide the WTRUs 502a, 502b, and/or 502c with access to packet-switched networks, such as the Internet 510, to facilitate communications between and the WTRUs 502a, 502b, and/or 502c and IP-enabled devices.

As noted above, the core network 506 may also be connected to the networks 512, which may include other wired or wireless networks that are owned and/or operated by other service providers.

Figure 16D:
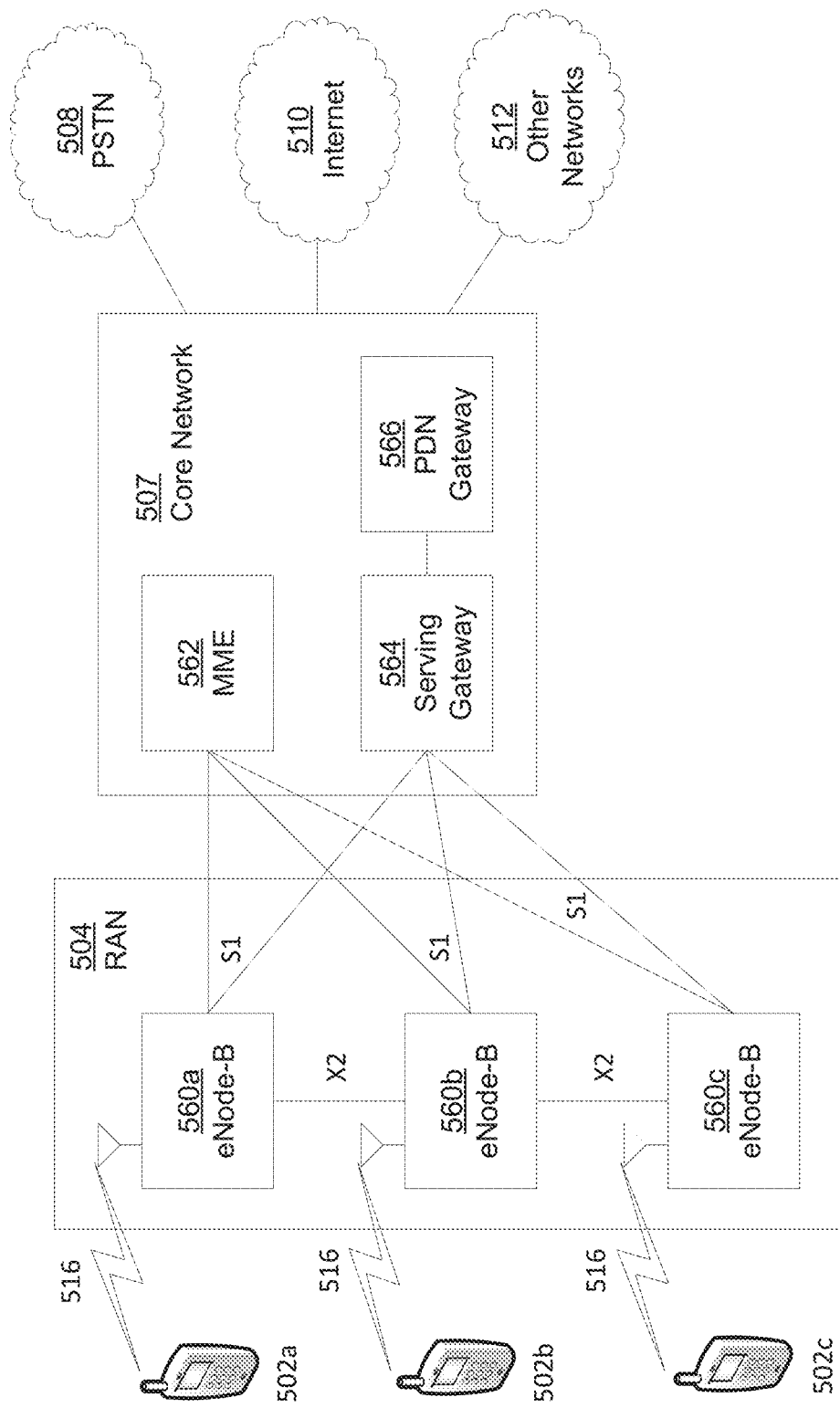
FIG. 16D depicts a system diagram of another example radio access network and an example core network that may be used within the communications system illustrated in FIG. 16A.

FIG. 16D depicts a system diagram of the RAN 504 and the core network 507 according to an embodiment. As noted above, the RAN 504 may employ an E-UTRA radio technology to communicate with the WTRUs 502a, 502b, and/or 502c over the air interface 516. The RAN 504 may also be in communication with the core network 507.

The RAN 504 may include eNode-Bs 560a, 560b, and/or 560c, though it will be appreciated that the RAN 504 may include any number of eNode-Bs while remaining consistent with an embodiment. The eNode-Bs 560a, 560b, and/or 560c may each include one or more transceivers for communicating with the WTRUs 502a, 502b, and/or 502c over the air interface 516. In one embodiment, the eNode-Bs 560a, 560b, and/or 560c may implement MIMO technology. Thus, the eNode-B 560a, for example, may use multiple antennas to transmit wireless signals to, and receive wireless signals from, the WTRU 502a.

Each of the eNode-Bs 560a, 560b, and/or 560c may be associated with a particular cell (not shown) and may be configured to handle radio resource management decisions, handover decisions, scheduling of users in the uplink and/or downlink, and the like. As shown in FIG. 16D, the eNode-Bs 560a, 560b, and/or 560c may communicate with one another over an X2 interface.

The core network 507 shown in FIG. 16D may include a mobility management gateway (MME) 562, a serving gateway 564, and a packet data network (PDN) gateway 566. While each of the foregoing elements are depicted as part of the core network 507, it will be appreciated that any one of these elements may be owned and/or operated by an entity other than the core network operator.

The MME 562 may be connected to each of the eNode-Bs 560a, 560b, and/or 560c in the RAN 504 via an S1 interface and may serve as a control node. For example, the MME 562 may be responsible for authenticating users of the WTRUs 502a, 502b, and/or 502c, bearer activation/deactivation, selecting a particular serving gateway during an initial attach of the WTRUs 502a, 502b, and/or 502c, and the like. The MME 562 may also provide a control plane function for switching between the RAN 504 and other RANs (not shown) that employ other radio technologies, such as GSM or WCDMA.

The serving gateway 564 may be connected to each of the eNode-Bs 560a, 560b, and/or 560c in the RAN 504 via the S1 interface. The serving gateway 564 may generally route and forward user data packets to/from the WTRUs 502a, 502b, and/or 502c. The serving gateway 564 may also perform other functions, such as anchoring user planes during inter-eNode B handovers, triggering paging when downlink data is available for the WTRUs 502a, 502b, and/or 502c, managing and storing contexts of the WTRUs 502a, 502b, and/or 502c, and the like.

The serving gateway 564 may also be connected to the PDN gateway 566, which may provide the WTRUs 502a, 502b, and/or 502c with access to packet-switched networks, such as the Internet 510, to facilitate communications between the WTRUs 502a, 502b, and/or 502c and IP-enabled devices.

The core network 507 may facilitate communications with other networks. For example, the core network 507 may provide the WTRUs 502a, 502b, and/or 502c with access to circuit-switched networks, such as the PSTN 508, to facilitate communications between the WTRUs 502a, 502b, and/or 502c and traditional land-line communications devices. For example, the core network 507 may include, or may communicate with, an IP gateway (e.g., an IP multimedia subsystem (IMS) server) that serves as an interface between the core network 507 and the PSTN 508. In addition, the core network 507 may provide the WTRUs 502a, 502b, and/or 502c with access to the networks 512, which may include other wired or wireless networks that are owned and/or operated by other service providers.

Figure 16E:
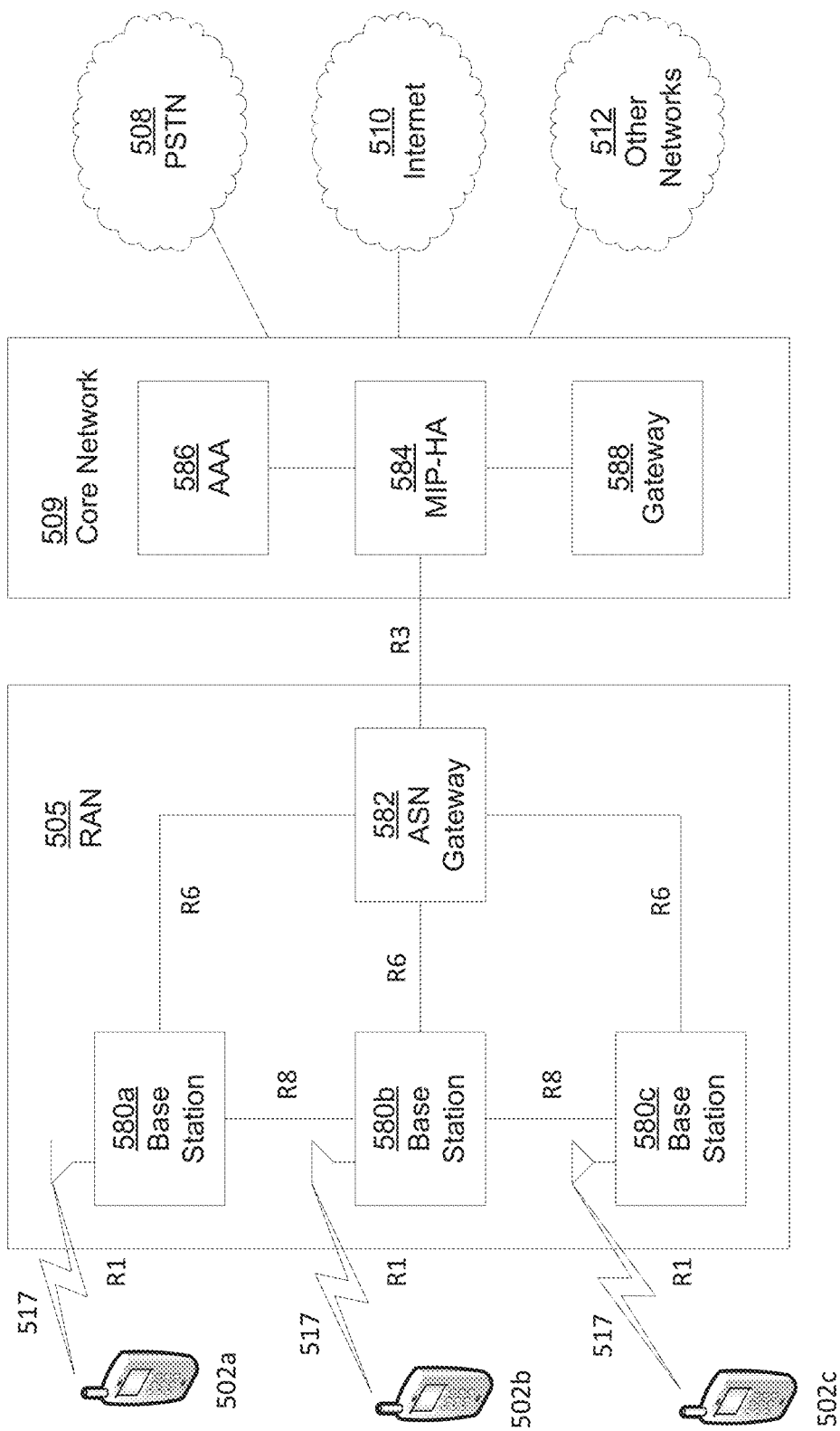
FIG. 16E depicts a system diagram of another example radio access network and an example core network that may be used within the communications system illustrated in FIG. 16A.

FIG. 16E depicts a system diagram of the RAN 505 and the core network 509 according to an embodiment. The RAN 505 may be an access service network (ASN) that employs IEEE 802.16 radio technology to communicate with the WTRUs 502a, 502b, and/or 502c over the air interface 517. As will be further discussed below, the communication links between the different functional entities of the WTRUs 502a, 502b, and/or 502c, the RAN 505, and the core network 509 may be defined as reference points.

As shown in FIG. 16E, the RAN 505 may include base stations 580a, 580b, and/or 580c, and an ASN gateway 582, though it will be appreciated that the RAN 505 may include any number of base stations and ASN gateways while remaining consistent with an embodiment. The base stations 580a, 580b, and/or 580c may each be associated with a particular cell (not shown) in the RAN 505 and may each include one or more transceivers for communicating with the WTRUs 502a, 502b, and/or 502c over the air interface 517. In one embodiment, the base stations 580a, 580b, and/or 580c may implement MIMO technology. Thus, the base station 580a, for example, may use multiple antennas to transmit wireless signals to, and receive wireless signals from, the WTRU 502a. The base stations 580a, 580b, and/or 580c may also provide mobility management functions, such as handoff triggering, tunnel establishment, radio resource management, traffic classification, quality of service (QoS) policy enforcement, and the like. The ASN gateway 582 may serve as a traffic aggregation point and may be responsible for paging, caching of subscriber profiles, routing to the core network 509, and the like.

The air interface 517 between the WTRUs 502a, 502b, and/or 502c and the RAN 505 may be defined as an R1 reference point that implements the IEEE 802.16 specification. In addition, each of the WTRUs 502a, 502b, and/or 502c may establish a logical interface (not shown) with the core network 509. The logical interface between the WTRUs 502a, 502b, and/or 502c and the core network 509 may be defined as an R2 reference point, which may be used for authentication, authorization, IP host configuration management, and/or mobility management.

The communication link between each of the base stations 580a, 580b, and/or 580c may be defined as an R8 reference point that includes protocols for facilitating WTRU handovers and the transfer of data between base stations. The communication link between the base stations 580a, 580b, and/or 580c and the ASN gateway 582 may be defined as an R6 reference point. The R6 reference point may include protocols for facilitating mobility management based on mobility events associated with each of the WTRUs 502a, 502b, and/or 502c.

As shown in FIG. 16E, the RAN 505 may be connected to the core network 509. The communication link between the RAN 505 and the core network 509 may defined as an R3 reference point that includes protocols for facilitating data transfer and mobility management capabilities, for example. The core network 509 may include a mobile IP home agent (MIP-HA) 584, an authentication, authorization, accounting (AAA) server 586, and a gateway 588. While each of the foregoing elements are depicted as part of the core network 509, it will be appreciated that any one of these elements may be owned and/or operated by an entity other than the core network operator.

The MIP-HA may be responsible for IP address management, and may enable the WTRUs 502a, 502b, and/or 502c to roam between different ASNs and/or different core networks. The MIP-HA 584 may provide the WTRUs 502a, 502b, and/or 502c with access to packet-switched networks, such as the Internet 510, to facilitate communications between the WTRUs 502a, 502b, and/or 502c and IP-enabled devices. The AAA server 586 may be responsible for user authentication and for supporting user services. The gateway 588 may facilitate interworking with other networks. For example, the gateway 588 may provide the WTRUs 502a, 502b, and/or 502c with access to circuit-switched networks, such as the PSTN 508, to facilitate communications between the WTRUs 502a, 502b, and/or 502c and traditional land-line communications devices. In addition, the gateway 588 may provide the WTRUs 502a, 502b, and/or 502c with access to the networks 512, which may include other wired or wireless networks that are owned and/or operated by other service providers.

Although not shown in FIG. 16E, it should, may, and/or will be appreciated that the RAN 505 may be connected to other ASNs and the core network 509 may be connected to other core networks. The communication link between the RAN 505 the other ASNs may be defined as an R4 reference point, which may include protocols for coordinating the mobility of the WTRUs 502a, 502b, and/or 502c between the RAN 505 and the other ASNs. The communication link between the core network 509 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for streaming video content, the method comprising:
    determining that a first set of future video segments of the video content is closer than a second set of future video segments of the video content relative to a current playback position of the video content;
    determining that the second set of future video segments is associated with higher artistic interest values than the first set of future video segments, and that a playback time of at least one of the second set of future video segments is inside a time window from the current playback position; and
    responsive to the determination that the second set of future video segments is associated with higher artistic interest values than the first set of future video segments and that the playback time of the at least one of the second set of future video segments is inside the time window:
    requesting one or more video segments among the second set of future video segments ahead of at least one of the first set of future video segments.

2. The method of claim 1, further comprising receiving a description of the video content, wherein the description indicates that the second set of future video segments is associated with higher artistic interest values than the first set of future video segments.

3. The method of claim 2, wherein the description further indicates a size of the time window.

4. The method of claim 1, wherein the one or more video segments among the second set of future video segments are a number of video segments among the second set of future video segments that are determined based on the higher artistic interest values associated with the second set of future video segments.

5. The method of claim 1, further comprising requesting the second set of future video segments so as to maintain a buffer level above a threshold.

6. The method of claim 5, wherein the first set of future video segments is requested at a lower quality level than the second set of future video segments.

7. The method of claim 1, wherein the first set of future video segments and the second set of future video segments each includes a base layer and an enhancement layer, the enhancement layer being dependent on the base layer for decoding.

8. The method of claim 7 wherein the request for each of the first set of future video segments is for the base layer, and wherein the request for each of the second set of future video segments is for both the base layer and the enhancement layer.

9. The method of claim 1, wherein each of the first set of future video segments includes a base layer and an enhancement layer that depends on the base layer for decoding, and wherein each of the second set of future video segments includes a single layer.

10. The method of claim 9, wherein the request for each of the first set of future video segments is for at least the base layer, and wherein the request for each of the second set of future video segments is for the single layer.

11. The method of claim 1, wherein the one or more video segments among the second set of future video segments are a number of video segments among the second set of future video segments that are determined based on at least one of a network bandwidth, a layer dependency, a segment size, or a segment display time.

12. A device configured to stream video content, the device comprising a processor configured to:
    determine that a first set of future video segments of the video content is closer than a second set of future video segments of the video content relative to a current playback position of the video content;
    determine that the second set of future video segments is associated with higher artistic interest values than the first set of future video segments, and that a playback time of at least one of the second set of future video segments is inside a time window from the current playback position; and
    responsive to the determination that the second set of future video segments is associated with higher artistic interest values than the first set of future video segments that the playback time of the at least one of the second set of future video segments is inside the time window:
    request one or more video segments among the second set of future video segments ahead of at least one of the first set of future video segments.

13. The device of claim 12, wherein the processor is further configured to receive a description of the video content, wherein the description indicates that the second set of future video segments is associated with higher artistic interest values than the first set of future video segments.

14. The device of claim 13, wherein the description further indicates a size of the time window.

15. The device of claim 12, wherein the one or more video segments among the second set of future video segments are a number of video segments among the second set of future video segments that are determined based on the higher artistic interest values associated with the second set of future video segments.

16. The device of claim 12, wherein the processor is further configured to request the second set of future video segments so as to maintain a buffer level above a threshold.

17. The device of claim 16, wherein the processor is configured to request the first set of future video segments at a lower quality level than the second set of future video segments.

18. The device of claim 12, wherein the first set of future video segments and the second set of future video segments each includes a base layer and an enhancement layer, the enhancement layer being dependent on the base layer for decoding.

19. The device of claim 18, wherein the request for each of the first set of future video segments is for the base layer, and wherein the request for each of the second set of future video segments is for both the base layer and the enhancement layer.

20. The device of claim 12, wherein each of the first set of future video segments includes a base layer and an enhancement layer that depends on the base layer for decoding, and wherein each of the second set of future video segments includes a single layer.

21. The device of claim 20, wherein the request for each of the first set of future video segments is for at least the base layer, and wherein the request for each of the second set of future video segments is for the single layer.

22. The device of claim 12, wherein the one or more video segments among the second set of future video segments are a number of video segments among the second set of future video segments that are determined based on at least one of a network bandwidth, a layer dependency, a segment size, or a segment display time.

* * * * *